(12) United States Patent
Ji et al.

(10) Patent No.: US 10,863,493 B2
(45) Date of Patent: *Dec. 8, 2020

(54) SCHEDULING OF DOWNLINK TRANSMISSIONS BASED ON EXCHANGES OF PRE-SCHEDULING AND SCHEDULING MESSAGES

(71) Applicant: QUALCOMM Incorporated, San Diego, CA (US)

(72) Inventors: Tingfang Ji, San Diego, CA (US); Krishna Kiran Mukkavilli, San Diego, CA (US); John Edward Smee, San Diego, CA (US); Joseph Binamira Soriaga, San Diego, CA (US); Naga Bhushan, San Diego, CA (US); Jing Jiang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 71 days.

This patent is subject to a terminal disclaimer.

(21) Appl. No.: 16/216,644

(22) Filed: Dec. 11, 2018

(65) Prior Publication Data

US 2019/0124630 A1 Apr. 25, 2019

Related U.S. Application Data

(63) Continuation of application No. 14/881,996, filed on Oct. 13, 2015, now Pat. No. 10,182,426.
(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0048* (2013.01); *H04W 72/082* (2013.01);
(Continued)

(58) Field of Classification Search
None
See application file for complete search history.

(56) References Cited

U.S. PATENT DOCUMENTS 8,325,661 B2   12/2012  Montojo et al.
8,738,981 B2   5/2014   Gorokhov et al.
(Continued)

FOREIGN PATENT DOCUMENTS

CN   101919302 A   12/2010
CN   102149204 A   8/2011
(Continued)

OTHER PUBLICATIONS

International Preliminary Report on Patentability—PCT/US2016/020986, The International Bureau of WIPO—Geneva, Switzerland, dated May 18, 2017.
(Continued)

*Primary Examiner* — Diane L Lo
(74) *Attorney, Agent, or Firm* — Holland & Hart LLP/Qualcomm

(57) ABSTRACT

Techniques are described for wireless communication. An exemplary method includes receiving, at a first device, a pre-scheduling message for a downlink transmission from a second device; transmitting a scheduling message to the second device in response to receiving the pre-scheduling message; and receiving the downlink transmission in accordance with the at least one downlink transmission parameter of the scheduling message. The scheduling message may include at least one downlink transmission parameter. Another exemplary method includes transmitting, to a first
(Continued)

device, a pre-scheduling message for a downlink transmission; receiving, from the first device, a scheduling message comprising at least one downlink transmission parameter; and transmitting the downlink transmission to the first device in accordance with the at least one downlink transmission parameter of the scheduling message.

29 Claims, 15 Drawing Sheets

Related U.S. Application Data

(60) Provisional application No. 62/133,211, filed on Mar. 13, 2015.

(51) Int. Cl.
*H04W 72/12* (2009.01)
*H04W 72/08* (2009.01)
*H04W 88/06* (2009.01)

(52) U.S. Cl.
CPC ....... *H04W 72/12* (2013.01); *H04W 72/1273* (2013.01); *H04W 72/1278* (2013.01); *H04W 88/06* (2013.01)

(56) References Cited

U.S. PATENT DOCUMENTS

| | | |
|---|---|---|
| 9,026,164 B2 | 5/2015 | Gorokhov et al. |
| 9,049,730 B2 | 6/2015 | Vajapeyam et al. |
| 10,182,426 B2 * | 1/2019 | Ji .......................... H04W 72/12 |
| 2010/0227606 A1 | 9/2010 | Nan et al. |
| 2011/0188599 A1 | 8/2011 | Kang et al. |
| 2011/0217985 A1 | 9/2011 | Gorokhov |
| 2012/0172038 A1 | 7/2012 | Kim et al. |
| 2012/0269143 A1 | 10/2012 | Bertrand et al. |
| 2014/0342748 A1 | 11/2014 | Zou |
| 2014/0362813 A1 | 12/2014 | Hu et al. |
| 2015/0237649 A1 | 8/2015 | Zhang et al. |
| 2016/0270037 A1 | 9/2016 | Ji et al. |
| 2017/0019918 A1 | 1/2017 | Voigt et al. |

FOREIGN PATENT DOCUMENTS

| | | |
|---|---|---|
| CN | 103270804 A | 8/2013 |
| CN | 103718635 A | 4/2014 |
| WO | WO-2010025279 | 3/2010 |
| WO | WO2010025678 A1 | 3/2010 |
| WO | WO2012088270 A1 | 6/2012 |
| WO | WO-2013181483 A2 | 12/2013 |
| WO | WO2014165832 A1 | 10/2014 |

OTHER PUBLICATIONS

International Search Report and Written Opinion—PCT/US2016/020986—ISA/EPO—dated May 18, 2016.
European Search Report—EP20155351—Search Authority—The Hague—dated Apr. 20, 2020 (152587EPD1).

* cited by examiner

SCHEDULING OF DOWNLINK TRANSMISSIONS BASED ON EXCHANGES OF PRE-SCHEDULING AND SCHEDULING MESSAGES

CROSS REFERENCES

The present Application for Patent is a continuation of U.S. patent application Ser. No. 14/881,996 by Ji et al., entitled, "Scheduling of Downlink Transmissions Based on Exchanges of Pre-Scheduling and Scheduling Messages" filed Oct. 13, 2015, which claims priority to U.S. Provisional Patent Application No. 62/133,211 by Ji et al., entitled "Scheduling Downlink Transmissions Based on Exchanges of Pre-Scheduling and Scheduling Messages," filed Mar. 13, 2015, assigned to the assignee hereof, and expressly incorporated by reference herein.

BACKGROUND

Field of the Disclosure

The present disclosure, for example, relates to wireless communication systems, and more particularly to techniques for scheduling downlink transmissions based on exchanges of pre-scheduling and scheduling messages.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, single-carrier frequency-division multiple access (SC-FDMA) systems, and orthogonal frequency-division multiple access (OFDMA) systems.

By way of example, a wireless multiple-access communication system may include a number of base stations, Wi-Fi access points, or other nodes, each simultaneously supporting communication for multiple communication devices, which each may be referred to as a user equipment (UE). A base station or Wi-Fi access point may communicate with UEs on downlink channels (e.g., for transmissions from a base station or Wi-Fi access point to a UE) and uplink channels (e.g., for transmissions from a UE to a base station or Wi-Fi access point).

Because a base station or Wi-Fi access point may simultaneously communicate with multiple UEs, and may have more information on network or backhaul loading, the scheduling of transmissions on both downlink channels and uplink channels may be performed by the base station or Wi-Fi access point for all of the UEs with which it communicates.

SUMMARY

The present disclosure, for example, relates to one or more techniques for scheduling downlink transmissions based on exchanges of pre-scheduling and scheduling messages. Although a base station or Wi-Fi access point may communicate with multiple UEs and have more information than a UE on network or backhaul loading, scenarios are arising in which unilateral scheduling of downlink transmissions by base stations, Wi-Fi access points, and other transmitters is causing an increasing percentage of non-acknowledgements (NAKs) of downlink transmissions by UEs, undesired power use, interference, and other issues at a UE. For example, when a UE is operating in a multi-connectivity mode, the scheduling of traffic for multiple component carriers may be scheduled unilaterally by a base station or Wi-Fi access point, despite one or more radios of the UE being used for other purposes or being exposed to internal or external interference. This may increase the percentage of NAKs transmitted by the UE. As another example, when a UE is communicating using multiple radios and multiple radio access technologies (RATs), the unilateral scheduling of traffic by a base station or Wi-Fi access point may not account for in-device coexistence (IDC; e.g., radio frequency (RF) coexistence) of the multiple radios and/or RATs used by the UE. This may also increase the percentage of NAKs transmitted by the UE.

As another example, a UE may operate in accordance with a power saving profile that is not known by a base station or Wi-Fi access point, and unilateral scheduling of downlink transmissions by the base station or Wi-Fi access point may interfere with the UE's implementation of its power saving profile. As another example, a UE may attempt to coexist with other devices within its energy detection range, and unilateral scheduling of downlink transmissions by a base station or Wi-Fi access point may interfere with the UE's ability to coexist with the other devices. The techniques described in the present disclosure provide for an exchange of pre-scheduling and scheduling messages between a base station (or Wi-Fi access point) and a UE, which may enable the UE to specify or restrict some or all of the aspects of a downlink transmission.

A method for wireless communication is described. The method may include receiving, at a first device, a pre-scheduling message for a downlink transmission from a second device; transmitting a scheduling message to the second device in response to receiving the pre-scheduling message; and receiving the downlink transmission in accordance with the at least one downlink transmission parameter of the scheduling message. The scheduling message may include at least one downlink transmission parameter.

An apparatus for wireless communication is described. The apparatus may include means for receiving, at a first device, a pre-scheduling message for a downlink transmission from a second device; means for transmitting a scheduling message to the second device in response to receiving the pre-scheduling message; and means for receiving the downlink transmission in accordance with the at least one downlink transmission parameter of the scheduling message. The scheduling message may include at least one downlink transmission parameter.

Another apparatus for wireless communication is described. The apparatus may include a processor, memory in electronic communication with the processor, and instructions stored in the memory. The instructions may be executable by the processor to cause the apparatus to receive, at a first device, a pre-scheduling message for a downlink transmission from a second device; to transmit a scheduling message to the second device in response to receiving the pre-scheduling message; and to receive the downlink transmission in accordance with the at least one downlink transmission parameter of the scheduling message. The scheduling message may include at least one downlink transmission parameter.

A non-transitory computer-readable medium storing computer-executable code for wireless communication is described. The code may be executable by a processor to receive, at a first device, a pre-scheduling message for a downlink transmission from a second device; to transmit a scheduling message to the second device in response to receiving the pre-scheduling message; and to receive the downlink transmission in accordance with the at least one downlink transmission parameter of the scheduling message. The scheduling message may include at least one downlink transmission parameter.

Some examples of the method, apparatuses, or non-transitory computer-readable medium may include steps, features, means, or instructions for operating the first device in a multi-connectivity mode using a plurality of radios of the first device, where the at least one downlink transmission parameter of the scheduling message identifies a subset of radios of the plurality of radios.

In some examples of the method, apparatuses, or non-transitory computer-readable medium, the pre-scheduling message may identify a transmission type, and the method, apparatuses, or non-transitory computer-readable medium may include steps, features, means, or instructions for selecting the subset of radios based at least in part on the transmission type.

Some examples of the method, apparatuses, or non-transitory computer-readable medium may include steps, features, means, or instructions for identifying an availability of each radio in the subset of radios, where the at least one downlink transmission parameter of the scheduling message includes the identified availability of each radio in the subset of radios. In some examples of the method, apparatuses, or non-transitory computer-readable medium, the identified availability of each radio in the subset of radios may include at least a time domain availability, or a frequency domain availability, or a combination thereof.

Some examples of the method, apparatuses, or non-transitory computer-readable medium may include steps, features, means, or instructions for communicating at the first device using a plurality of radios and a plurality of radio access technologies of the first device, and identifying an availability of at least one radio in the plurality of radios, where the at least one downlink transmission parameter of the scheduling message includes the identified availability of the at least one radio. In some examples of the method, apparatuses, or non-transitory computer-readable medium the identified availability of the at least one radio may include at least a time domain availability, or a frequency domain availability, or a combination thereof. In some examples of the method, apparatuses, or non-transitory computer-readable medium the identified availability of the at least one radio may be based at least in part on a scheduling or interference of at least one other radio in the plurality of radios.

In some examples of the method, apparatuses, or non-transitory computer-readable medium, the downlink transmission may be received over a backhaul link, and the method may include steps, features, means, or instructions for operating the first device as a relay for at least one access link, and identifying an availability of at least one radio of the first device based at least in part on a scheduled use of the at least one access link, where the at least one downlink transmission parameter of the scheduling message includes the identified availability of the at least one radio. In some examples of the method, apparatuses, or non-transitory computer-readable medium, the identified availability of the at least one radio may include at least a time domain availability, or a frequency domain availability, or a combination thereof.

In some examples of the method, apparatuses, or non-transitory computer-readable medium, the pre-scheduling message may include a pilot signal, and the method, apparatuses, or non-transitory computer-readable medium may include steps, features, means, or instructions for estimating an interference on a wireless channel based at least in part on the pilot signal, and identifying the at least one downlink transmission parameter of the scheduling message based at least in part on the estimated interference. Some examples, the method, apparatuses, or non-transitory computer-readable medium may include steps, features, means, or instructions for estimating a duration of the interference, and identifying the at least one downlink transmission parameter of the scheduling message based at least in part on the estimated duration of the interference.

In some examples of the method, apparatuses, or non-transitory computer-readable medium, receiving the pre-scheduling message may include receiving at least a buffer status of downlink traffic for the first device, or an identification of a transmission type, or a restriction on scheduling the downlink transmission, or a combination thereof.

In some examples of the method, apparatuses, or non-transitory computer-readable medium, the at least one downlink transmission parameter of the scheduling message may include at least a radio restriction, or a carrier restriction, or a time restriction, or a frequency restriction, or a modulation and coding scheme (MCS) restriction, or a beamforming restriction, or a combination thereof.

In some examples of the method, apparatuses, or non-transitory computer-readable medium, the at least one downlink transmission parameter of the scheduling message may include at least a carrier restriction, or a sub-band restriction, or a resource block restriction, or a combination thereof.

In some examples of the method, apparatuses, or non-transitory computer-readable medium, the at least one downlink transmission parameter of the scheduling message may include at least information enabling the first device to satisfy a sleep schedule, or information enabling the first device to satisfy a power usage ceiling, or information enabling the first device to defer use of a wideband data chain.

Another method for wireless communication is described. The method may include transmitting, to a first device, a pre-scheduling message for a downlink transmission; receiving, from the first device, a scheduling message including at least one downlink transmission parameter; and transmitting the downlink transmission to the first device in accordance with the at least one downlink transmission parameter of the scheduling message.

Another apparatus for wireless communication is described. The apparatus may include means for transmitting, to a first device, a pre-scheduling message for a downlink transmission; means for receiving, from the first device, a scheduling message including at least one downlink transmission parameter; and means for transmitting the downlink transmission to the first device in accordance with the at least one downlink transmission parameter of the scheduling message.

Another apparatus for wireless communication is described. The apparatus may include a processor, memory in electronic communication with the processor, and instructions stored in the memory. The instructions may be executable by the processor to cause the apparatus to transmit, to a first device, a pre-scheduling message for a downlink transmission; to receive, from the first device, a scheduling message including at least one downlink transmission parameter; and to transmit the downlink transmission to the first device in accordance with the at least one downlink transmission parameter of the scheduling message.

Another non-transitory computer-readable medium storing computer-executable code for wireless communication is described. The code may be executable by a processor to transmit, to a first device, a pre-scheduling message for a downlink transmission; to receive, from the first device, a scheduling message including at least one downlink transmission parameter; and to transmit the downlink transmission to the first device in accordance with the at least one downlink transmission parameter of the scheduling message.

Some examples of the method, apparatuses, or non-transitory computer-readable medium may include steps, features, means, or instructions for transmitting the downlink transmission upon determining that the at least one downlink transmission parameter of the scheduling message can be satisfied.

In some examples of the method, apparatuses, or non-transitory computer-readable medium, the pre-scheduling message may include at least a buffer status of downlink traffic for the first device, or a transmission type, or a restriction on scheduling the downlink transmission, or a combination thereof.

In some examples of the method, apparatuses, or non-transitory computer-readable medium, the at least one downlink transmission parameter of the scheduling message may include at least a radio restriction, or a carrier restriction, or a time restriction, or a frequency restriction, or a MCS restriction, or a beamforming restriction, or a combination thereof.

In some examples of the method, apparatuses, or non-transitory computer-readable medium, the at least one downlink transmission parameter of the scheduling message may include at least a carrier restriction, or a sub-band restriction, or a resource block restriction, or a combination thereof.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described in which a pre-scheduling message and a scheduling message are exchanged, between a base station or Wi-Fi access point and a UE, before the base station or Wi-Fi access point schedules a downlink transmission to the UE. The pre-scheduling message may be transmitted by the base station and may include, for example, a buffer status of downlink traffic for the UE, or an identification of a transmission type, or a restriction on scheduling the downlink transmission, or a combination thereof. In response to receiving the pre-scheduling message, the UE may transmit the scheduling message to the base station. The scheduling message may include at least one downlink transmission parameter, such as a radio restriction, or a carrier restriction, or a time restriction, or a frequency restriction, or a modulation and coding scheme (MCS) restriction, or a beamforming restriction, or a combination thereof. Upon receiving the scheduling message, the base station may transmit the downlink in accordance with the at least one downlink transmission parameter. In this manner, the UE may schedule (or assist in scheduling) the downlink transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
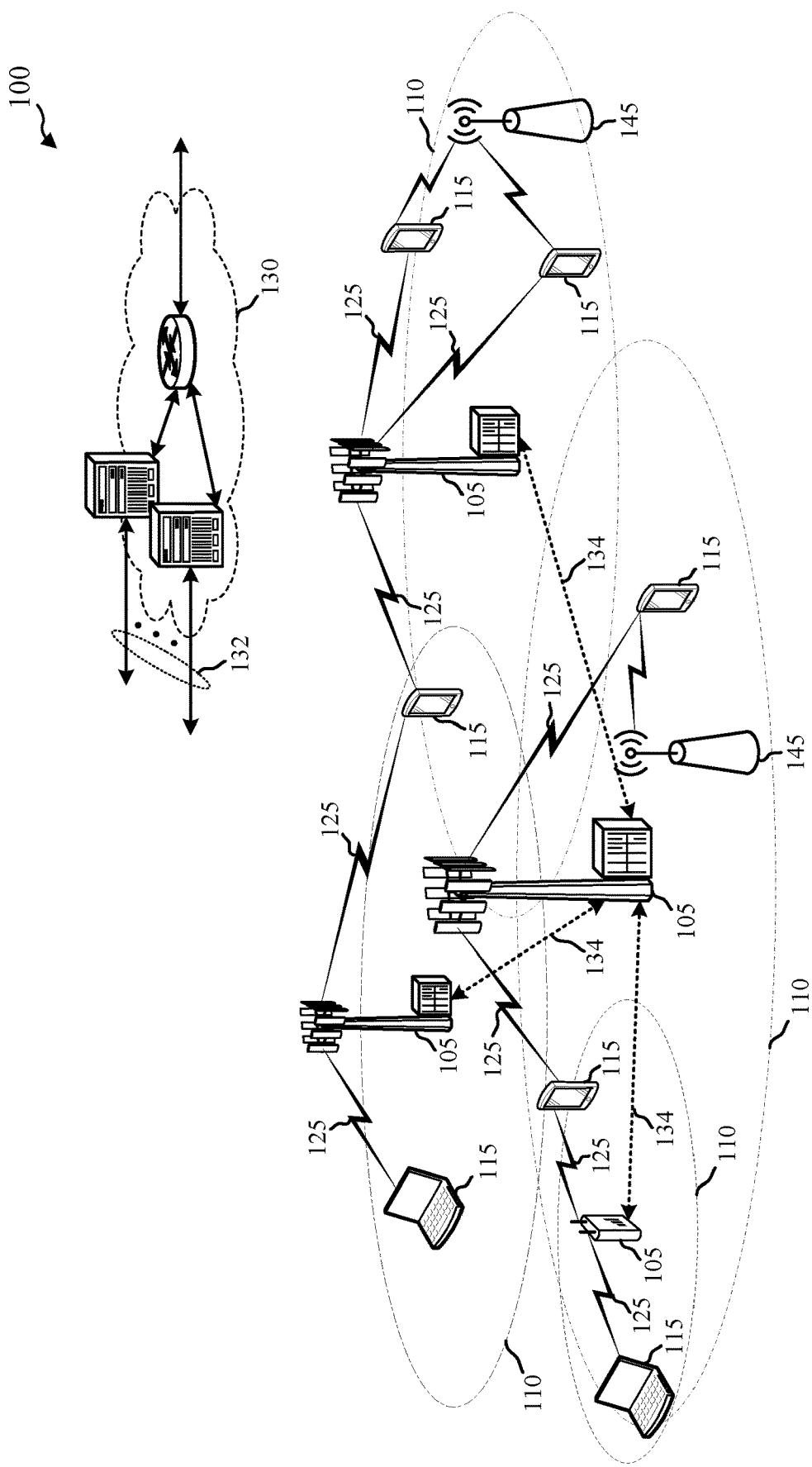
FIG. 1 illustrates an example of a wireless communication system, in accordance with aspects of the present disclosure.

FIG. 1 illustrates an example of a wireless communication system 100, in accordance with aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via at least one base station antenna. Each of the base station 105 sites may provide communication coverage for a respective geographic coverage area 110. In some examples, a base station 105 may be referred to as a base transceiver station, a radio base station, an access point, a radio transceiver, a NodeB, an enhanced/evolved NodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). The base stations 105 may be configured to communicate with one or more communication technologies, where each communication technology may have a geographic coverage area 110. The geographic coverage area 110 for a first communication technology may overlap with the geographic coverage area 110 for a second communication technology, and the first and second communication technology may be associated with the same base station 105, or different base stations 105.

In some examples, the wireless communication system 100 may include an LTE/LTE-A network. In LTE/LTE-A networks, the term evolved Node B (eNB) may be used to describe the base stations 105, while the term UE may be used to describe the UEs 115. The wireless communication system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3rd Generation Partnership Project (3GPP) term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., dedicated, shared, etc.) radio frequency spectrums as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

A UE 115 may be a cellular phone, a personal digital assistant (PDA), a wireless modem, a wireless communication device, a handheld device, a tablet computer, a laptop computer, a cordless phone, a wireless local loop (WLL) station, etc. A UE may be able to communicate with various types of base stations and network equipment, including macro eNBs, small cell eNBs, relay base stations, and the like. A UE may also be able to communicate using different RATs, such as a cellular RAT, a Wi-Fi RAT, or other RATs. As shown in FIG. 1, and by way of example, a UE 115 may simultaneously communicate with base stations 105 and Wi-Fi access points 145.

The communication links 125 shown in wireless communication system 100 may include downlink (DL) transmissions, from a base station 105 or Wi-Fi access point 145 to a UE 115, or uplink (UL) transmissions, from a UE 115 to a base station 105 or Wi-Fi access point 145. The downlink transmissions may be called forward link transmissions, while the uplink transmissions may be called reverse link transmissions. Downlink transmissions in the wireless communication system 100 may be scheduled by a base station 105 or Wi-Fi access point 145, or jointly, by a base station 105 or Wi-Fi access point 145 and a UE 115, as described herein. In some examples, the scheduling of a downlink transmission may include an exchange of a pre-scheduling and scheduling message between a base station 105 or Wi-Fi access point 145 and a UE 115.

In some examples, each communication link 125 may include at least one carrier, where each carrier may be a signal made up of multiple sub-carriers (e.g., waveform signals of different frequencies) modulated according to the various radio technologies described herein. Each modulated signal may be sent on a different sub-carrier and may carry control information (e.g., reference signals, control channels, etc.), overhead information, user data, etc. The communication links 125 may transmit bidirectional communications using a frequency domain duplexing (FDD) operation (e.g., using paired spectrum resources) or a time domain duplexing (TDD) operation (e.g., using unpaired spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. A UE 115 may have multiple downlink CCs and at least one uplink CC for carrier aggregation. Carrier aggregation may be used with both FDD and TDD component carriers.

Figure 2:
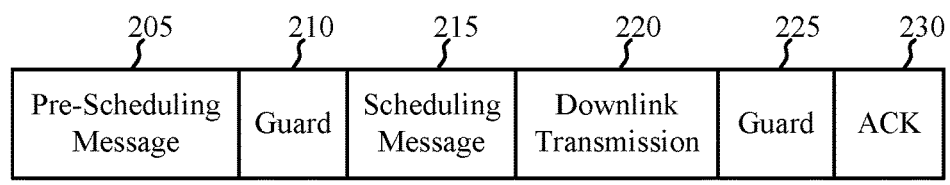
FIG. 2 shows a subframe structure for use in a downlink transmission received at a first device from a second device, in accordance with aspects of the present disclosure.

FIG. 2 shows a subframe structure 200 for use in a downlink transmission received at a first device from a second device, in accordance with aspects of the present disclosure. In some examples, the first device may be one of the UEs 115 described with reference to FIG. 1, and the second device may be one of the base stations 105 or Wi-Fi access points 145 described with reference to FIG. 1. The subframe structure 200 may include a pre-scheduling message period 205, a scheduling message period 215, a downlink transmission period 220, or an acknowledgement (ACK) period 230. A first guard period 210 may be included between the pre-scheduling message period 205 and the scheduling message period 215, and a second guard period 225 may be included between the downlink transmission period 220 and the acknowledgement period 230.

During the pre-scheduling message period 205, the second device may transmit (and the first device may receive) a pre-scheduling message for a downlink transmission (e.g., a packet transmission) to the first device. In some examples, the pre-scheduling message may include at least a buffer status of downlink traffic for the first device, or an identification of a transmission type, or a restriction on scheduling the downlink transmission (e.g., a radio restriction, or a carrier restriction, or a time restriction, or a frequency restriction, or a modulation and coding scheme (MCS) restriction, or a beamforming restriction, or a combination thereof), or a combination thereof.

During the scheduling message period 215, the first device may transmit (and the second device may receive) a scheduling message. The scheduling message may be transmitted in response to receiving the pre-scheduling message during the pre-scheduling message period 205. The scheduling message may include at least one downlink transmission parameter (i.e., at least one parameter for transmitting the downlink transmission to the first device). In some examples, the at least one downlink transmission parameter of the scheduling message may include at least a radio restriction, or a carrier restriction, or a time restriction, or a frequency restriction, or a MCS restriction, or a beamforming restriction, or a combination thereof. In some examples, the at least one downlink transmission parameter of the scheduling message may include at least a carrier restriction, or a sub-band restriction, or a resource block restriction, or a combination thereof. In some examples, the at least one downlink transmission parameter of the scheduling message may include at least information enabling the first device to satisfy a sleep schedule, or information enabling the first device to satisfy a power usage ceiling, or information enabling the first device to defer use of a wideband data chain.

During the downlink transmission period 220, the second device may transmit (and the first device may receive) the downlink transmission to the first device in accordance with the at least one downlink transmission parameter of the scheduling message. In some examples, a downlink transmission parameter may indicate an allowed range of values (or indicate one or more values within a range that are not allowed). In these examples, the second device may select a value of the downlink transmission parameter to use for the downlink transmission. The selection may be based, for example, on the scheduling of one or more other downlink or uplink transmissions by the second device, on a power conservation policy, or on other factors. In other examples, a downlink transmission parameter may indicate a single allowed value for a downlink transmission parameter, or the scheduling message may fully schedule the downlink transmission (pending acceptance of the scheduling by the second device).

In some examples, the second device may transmit the downlink transmission upon determining that the at least one downlink transmission parameter of the scheduling message can be satisfied by the second device, but may not transmit the downlink transmission upon determining that the at least one downlink transmission parameter of the scheduling message cannot be satisfied by the second device. In some examples, the second device may make a best effort to satisfy the at least one downlink transmission parameter of the scheduling message. In some examples, the scheduling message may specify (or the first device and the second device may pre-agree on) a first set of one or more downlink transmission parameters that the second device must satisfy before transmitting the downlink transmission, and a second set of one or more downlink transmission parameters that the second device should make a best effort to satisfy before transmitting the downlink transmission.

During the acknowledgement (ACK) period 230, the first device may transmit (and the second device may receive) an acknowledgement (ACK) or a non-acknowledgement (NAK) of the downlink transmission.

During the first guard period 210 or the second guard period 225, the first device may acquire timing information from the second device.

Figure 3:
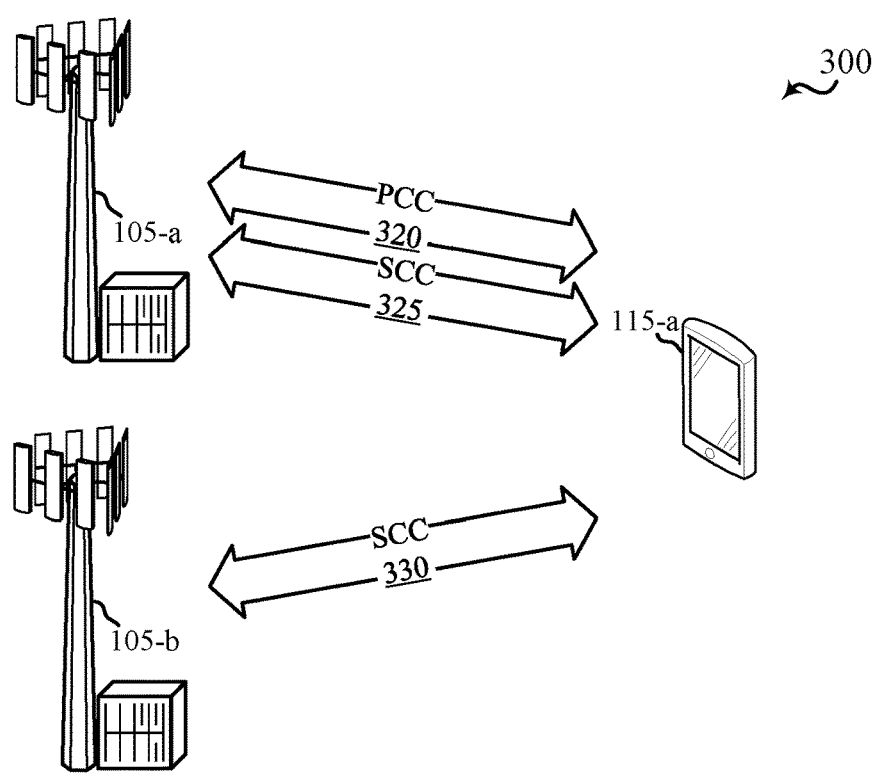
FIG. 3 shows a wireless communication system in which LTE/LTE-A may be deployed in a multi-connectivity scenario, in accordance with aspects of the present disclosure.

FIG. 3 shows a wireless communication system 300 in which LTE/LTE-A may be deployed in a multi-connectivity scenario, in accordance with aspects of the present disclosure. The wireless communication system 300 may be an example of portions of the wireless communication system 100 described with reference to FIG. 1. Moreover, a first base station 105-a and a second base station 105-b may be examples of aspects of one or more of the base stations 105 described with reference to FIG. 1, while a UE 115-a may be an example of aspects of one or more of the UEs 115 described with reference to FIG. 1.

When communicating in a multi-connectivity mode using LTE/LTE-A communications, the UE 115-a may communicate with multiple base stations, such as the first base station 105-a and the second base station 105-b, using a plurality of radios and in various examples up to five or more component carriers. One of the component carriers may be designated as a primary component carrier (PCC), and the remaining component carriers may be designated as a secondary component carrier (SCC). Each component carrier may be configured as a downlink component carrier, an uplink component carrier, or a cell (e.g., a component carrier that may be configured for use as a downlink component carrier and/or an uplink component carrier). By way of example, FIG. 3 illustrates communication between the UE 115-a and the first base station 105-a over two component carriers, including a first component carrier 320 and a second component carrier 325, of which the first component carrier 320 is the PCC and the second component carrier 325 is a SCC. FIG. 3 also illustrates communication between the UE 115-a and the second base station 105-b over a third component carrier 330 (another SCC).

When the UE 115-a is communicating with the first base station 105-a and/or the second base station 105-b using the subframe structure 200 described with reference to FIG. 2, the downlink transmission parameter(s) included in a scheduling message transmitted to a base station (e.g., the first base station 105-a or the second base station 105-b) during the scheduling message period 215 may identify a subset of radios (of the UE 115-a) that may potentially receive a downlink transmission from the base station. When a pre-scheduling message received by the UE 115-a identifies a transmission type (e.g., a type of downlink transmission, such as indication of whether the downlink transmission is a mission critical notification (e.g., a low latency type of transmission), a voice call, an email communication, etc.), the UE 115-a may identify the subset of radios based at least in part on the transmission type. The subset of radios may also be selected based at least in part on one or more other parameters identified in the pre-scheduling message, and/or in response to receiving the pre-scheduling message. The downlink transmission parameter(s) included in a scheduling message may also include an availability of each radio in the subset of radios (e.g., a time domain availability, or a frequency domain availability, or a combination thereof). The availability of a radio may be based at least in part on a coordination of the radio's traffic with one or more other radios (e.g., time domain coordination (e.g., time domain multiplexing (TDM'ing)) with the one or more other radios when the radio is a slave to another radio access technology (RAT), such as a Wi-Fi RAT, another LTE/LTE-A RAT, a data optimized (DO) RAT, etc., and/or frequency domain coordination (e.g., frequency domain multiplexing (FDM'ing)) with a radio using an adjacent or interfering carrier) or coordination of the radio's use by other RATs.

Figure 4:
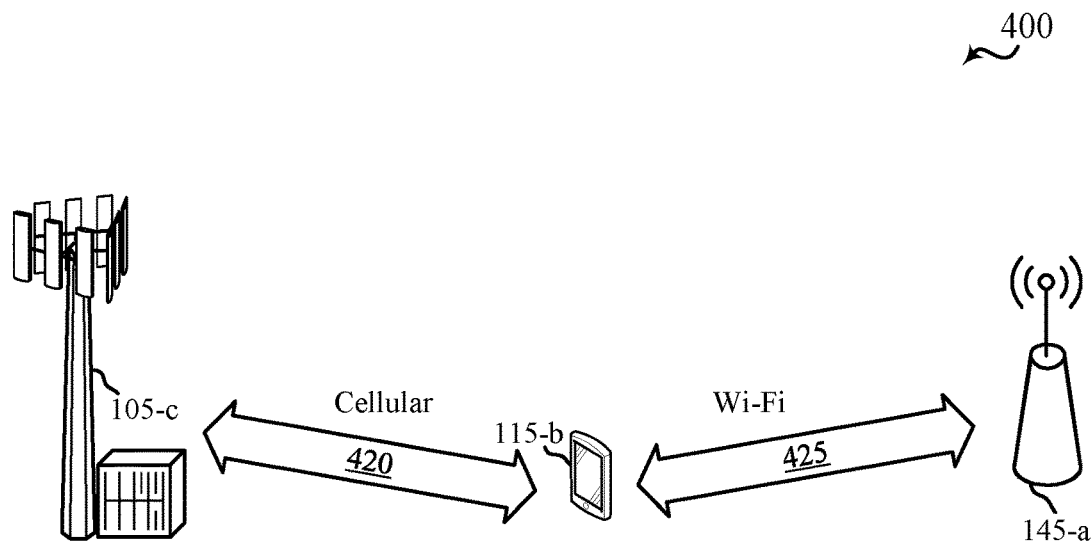
FIG. 4 shows a wireless communication system in which a UE may communicate using a plurality of radios and a plurality of RATs, in accordance with aspects of the present disclosure.

FIG. 4 shows a wireless communication system 400 in which a UE 115-b may communicate using a plurality of radios and a plurality of RATs, in accordance with aspects of the present disclosure. The wireless communication system 400 may be an example of portions of the wireless communication system 100 described with reference to FIG. 1. Moreover, a base station 105-c may be an example of aspects of one or more of the base stations 105 described with reference to FIG. 1, a Wi-Fi access point 145-a may be an example of aspects of one or more of the Wi-Fi access points 145 described with reference to FIG. 1, and the UE 115-b may be an example of aspects of one or more of the UEs 115 described with reference to FIG. 1.

When communicating using a plurality of radios and a plurality of RATs, the UE 115-b may, in parallel, communicate with the base station 105-c using a cellular communications link 420 (e.g., LTE/LTE-A communications) and communicate with the Wi-Fi access point 145-a using a Wi-Fi communications link 425. The UE 115-b may also or alternatively communicate with other devices or other RATs. Coordination between the radios and their uses may therefore be undertaken for in-device coexistence (IDC).

When the UE 115-b is communicating with the base station 105-c and/or the Wi-Fi access point 145-a using the subframe structure 200 described with reference to FIG. 2, the downlink transmission parameter(s) included in a scheduling message transmitted to the base station 105-c or the Wi-Fi access point 145-a during the scheduling message period 215 may include an availability of at least one radio of the UE 115-b that may potentially receive a downlink transmission from the base station 105-c or Wi-Fi access point 145-a (e.g., a time domain availability, or a frequency domain availability, or a combination thereof). In some examples, the availability of a radio may be based at least in part on a scheduling or interference of at least one other radio of the UE 115-b. The availability of a radio may also be based at least in part on one or more parameters identified in a pre-scheduling message, and/or in response to receiving a pre-scheduling message. In some examples, the availability of a radio may be based at least in part on a coordination of the radio's traffic with one or more other radios (e.g., time domain coordination (e.g., TDM'ing) with the one or more other radios when the radio is a slave to another RAT, such as a Wi-Fi RAT, another cellular RAT, a DO RAT, etc., and/or frequency domain coordination (e.g., FDM'ing) with a radio using an adjacent or interfering carrier) or coordination of the radio's use by other RATs.

Figure 5:
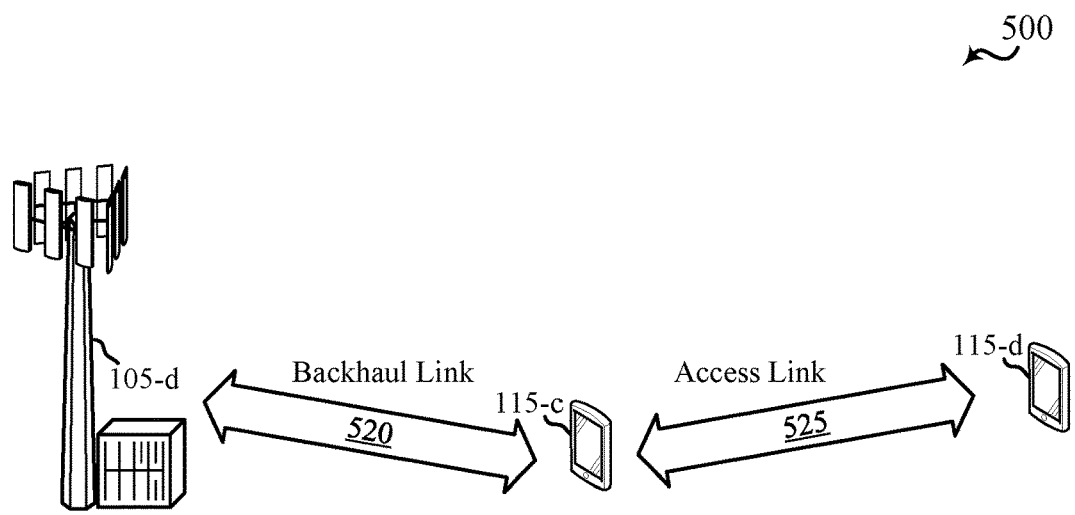
FIG. 5 shows a wireless communication system in which a first UE may operate as a relay for at least a second UE, in accordance with aspects of the present disclosure.

FIG. 5 shows a wireless communication system 500 in which a first UE 115-c may operate as a relay for at least a second UE 115-d, in accordance with aspects of the present disclosure. The wireless communication system 500 may be an example of portions of the wireless communication system 100 described with reference to FIG. 1. Moreover, a base station 105-*d* may be an example of aspects of one or more of the base stations 105 described with reference to FIG. 1, and the first UE 115-*c* and the second UE 115-*d* may be examples of aspects of one or more of the UEs 115 described with reference to FIG. 1.

As shown in FIG. 5, the first UE 115-*c* may communicate with the base station 105-*d* using, for example, LTE/LTE-A communications over a backhaul link 520. In parallel, the first UE 115-*c* may operate as a relay for the second UE 115-*d* and provide an access link 525 for communications between the first UE 115-*c* and the second UE 115-*d*. In some examples, the backhaul link 520 may be used for a downlink transmission while the access link 525 is also used for a downlink transmission, or the backhaul link 520 may be used for an uplink transmission while the access link 525 is also used for an uplink transmission. In these examples, the backhaul link 520 and access link 525 may be operated in a time-division multiplexed (TDM) mode. In other examples, the backhaul link 520 may be used for a downlink transmission while the access link 525 is used for an uplink transmission, or the backhaul link 520 may be used for an uplink transmission while the access link 525 is used for a downlink transmission. In these examples, the backhaul link 520 and access link 525 may be operated in an frequency-division multiplexed (FDM) mode.

When the first UE 115-*c* is communicating with the base station 105-*d* using the subframe structure 200 described with reference to FIG. 2 and the backhaul link 520, the downlink transmission parameter(s) included in a scheduling message transmitted to the base station 105-*c*, during the scheduling message period 215, may include an availability of at least one radio of the first UE 115-*c* that may potentially receive a downlink transmission from the base station 105-*d* (e.g., a time domain availability, or a frequency domain availability, or a combination thereof). In some examples, the availability of a radio may be based at least in part on a scheduled used of the backhaul link 520 or the access link 525. The availability of a radio may also be based at least in part on one or more parameters identified in a pre-scheduling message, and/or in response to receiving a pre-scheduling message. In some examples, the availability of a radio may be based at least in part on a coordination of the radio's traffic with one or more other radios (e.g., time domain coordination (e.g., TDM'ing) with the one or more other radios when the radio is a slave to another RAT, such as a Wi-Fi RAT, another cellular RAT, a DO RAT, etc., and/or frequency domain coordination (e.g., FDM'ing) with a radio using an adjacent or interfering carrier) or coordination of the radio's use by other RATs.

Figure 6:
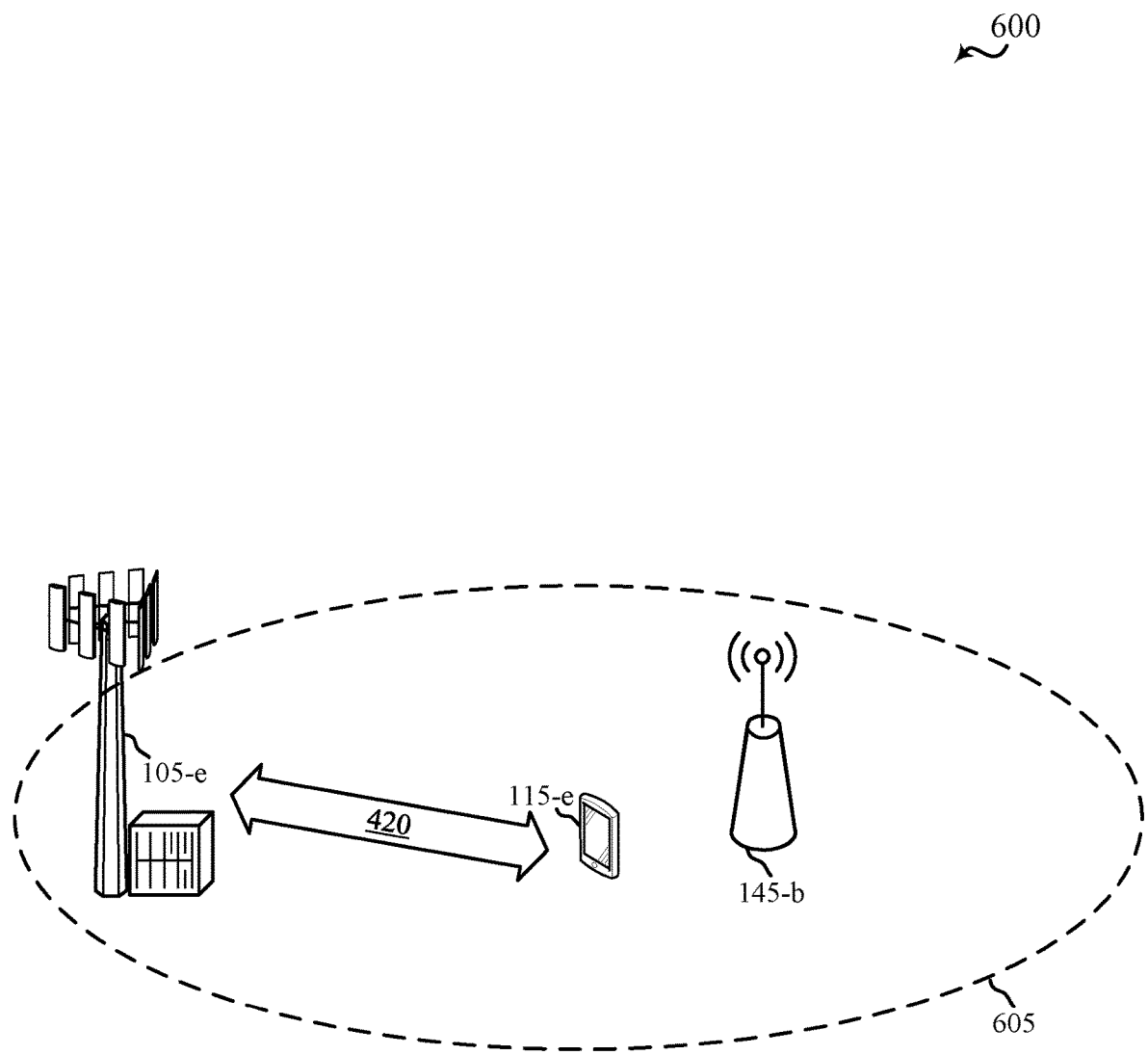
FIG. 6 shows a wireless communication system in which a UE may operate in an environment with interference, in accordance with aspects of the present disclosure.

FIG. 6 shows a wireless communication system 600 in which a UE 115-*e* may operate in an environment with interference, in accordance with aspects of the present disclosure. The wireless communication system 600 may be an example of portions of wireless communication systems 100, 300, 400, or 500 described with reference to FIG. 1, 3, 4, or 5. Moreover, a base station 105-*e* may be an example of aspects of one or more of the base stations 105 described with reference to FIG. 1,3, 4, or 5, a UE 115-*e* may be an example of aspects of one or more of the UEs 115 described with reference to FIG. 1, 3, 4, or 5, and a Wi-Fi access point 145-*b* may be an example of aspects of one or more of the Wi-Fi access points 145 described with reference to FIG. 1.

As shown in FIG. 6, the UE 115-*e* may communicate with the base station 105-*e* using, for example, LTE/LTE-A communications over a cellular communications link 420. Because the Wi-Fi access point 145-*b* operates within an energy detection range 605 of the UE 115-*e*, the UE 115-*e* may be subject to interference caused by transmissions of the Wi-Fi access point 145-*b* when attempting to receive and decode transmissions over the cellular communications link 420.

When the UE 115-*e* communicates with the base station 105-*e* using the subframe structure 200 described with reference to FIG. 2, the downlink transmission parameter(s) included in a scheduling message transmitted to the base station 105-*e* may be based at least in part on an estimated interference and/or estimated duration of an interference attributable to the Wi-Fi access point 145-*b* (and other interfering nodes). In some examples, a pre-scheduling message transmitted by the base station 105-*e* to the UE 115-*e* (e.g., during the pre-scheduling message period 205 of the subframe structure 200) may include a pilot signal (or multiple pilot signals). In these examples, the UE 115-*e* may estimate an interference on a wireless channel over which the pre-scheduling message is received based at least in part on the pilot signal (e.g., by measuring the pilot signal). The UE 115-*e* may then identify one or more downlink transmission parameters based at least in part on the estimated interference. For example, the UE 115-*e* may identify an MCS based at least in part on the estimated interference.

In some examples, the UE 115-*e* may estimate or determine a duration of the interference caused by the Wi-Fi access point 145-*b*. The UE 115-*e* may then identify one or more downlink transmission parameters based at least in part on the estimated or determined duration of the interference. For example, the UE 115-*e* may indicate a time domain availability of a radio that may receive a downlink transmission based at least in part on the estimated or determined duration (or periodicity, or other characteristic) of the interference. The UE 115-*e* may also or alternatively decode part or all of a transmission by the Wi-Fi access point 145-*b*, and determine an interference duration from the decoded part of the transmission. For example, the UE 115-*e* may decode a network allocation vector (NAV) included in a Request-to-Send (RTS) transmission and base an indication of time domain availability of a radio of the UE 115-*e* on a channel reservation time indicated by the NAV.

In any of the wireless communication systems 100, 300, 400, 500, or 600 described with reference to FIGS. 1 and 3-6, a UE 115 may in some cases operate in accordance with a power saving profile, such as a sleep schedule or a power usage ceiling. In these examples, the at least one downlink transmission parameter of a scheduling message transmitted during the scheduling message period 215 of the subframe structure 200 described with reference to FIG. 2 may include information enabling the first device to satisfy a sleep schedule (e.g., downlink transmission parameters that cause a downlink transmission to be transmitted over a short time and a wider frequency), or information enabling the first device to satisfy a power usage ceiling (e.g., downlink transmission parameters that cause a downlink transmission to be transmitted over a narrower frequency), or information enabling the first device to defer use of a wideband data chain (e.g., when the wideband data chain is not otherwise powered and a pre-scheduling message is received using a narrow band, low power, data chain).

Figure 7:
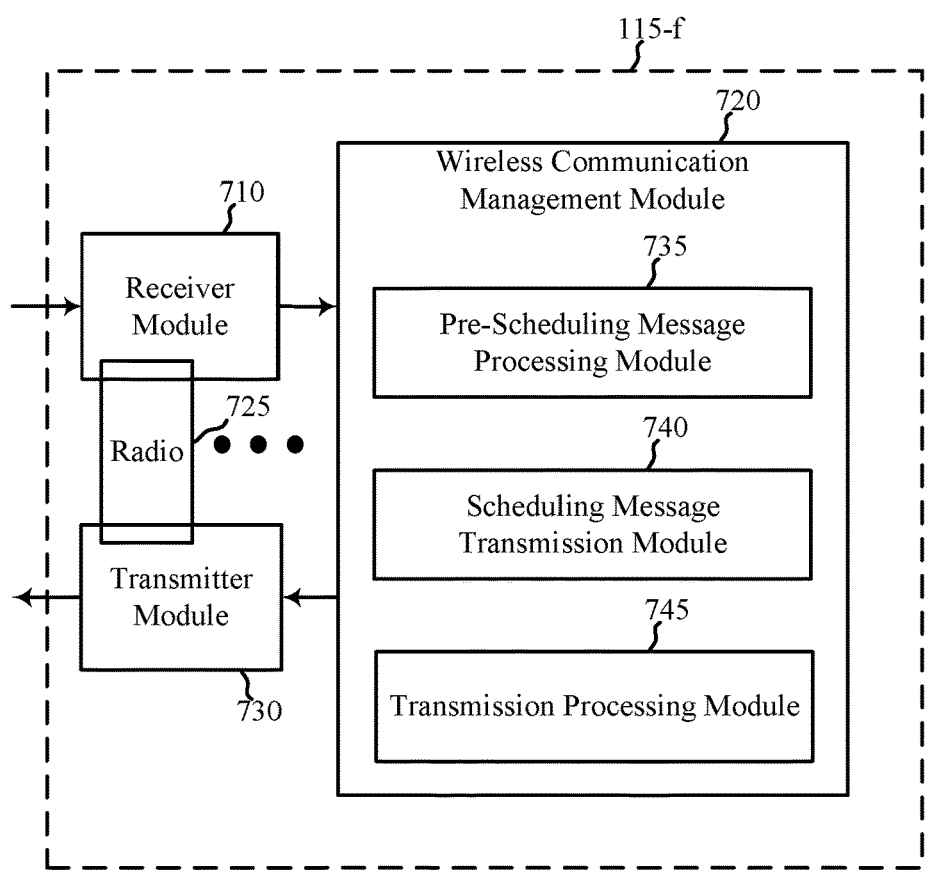
FIG. 7 shows a block diagram of a device for use in wireless communication, in accordance with aspects of the present disclosure.

FIG. 7 shows a block diagram 700 of a device 715-*a* for use in wireless communication, in accordance with aspects of the present disclosure. The device 715-*a* may be an example of aspects of one or more of the UEs 115 described with reference to FIG. 1, 3, 4, 5, or 6. The device 715-*a* may also be or include a processor. The device 715-*a* may include a receiver module 710, a wireless communication management module 720, a transmitter module 730, and at least one radio (e.g., radio 725). Each of these components may be in communication with each other.

The components of the device 715-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., a Structured/Platform ASIC, a Field Programmable Gate Array (FPGA), a System-on-Chip (SoC), and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 710 may include at least one radio frequency (RF) receiver. The receiver module 710 or RF receiver may be used to receive various types of data or control signals (i.e., transmissions) over one or more communication links of a wireless communication system, such as one or more communication links of wireless communication systems 100, 300, 400, 500, or 600 described with reference to FIG. 1, 3, 4, 5, or 6.

In some examples, the transmitter module 730 may include at least one RF transmitter. The transmitter module 730 or RF transmitter may be used to transmit various types of data or control signals (i.e., transmissions) over one or more communication links of a wireless communication system, such as one or more communication links of the wireless communication system 100, 300, 400, 500, or 600 described with reference to FIG. 1, 3, 4, 5, or 6.

In some examples, the radio 725 may be provided by the receiver module 710, the transmitter module 730, or a combination thereof, or the radio 725 may provide part or all of the receiver module 710, the transmitter module 730, or a combination thereof.

The wireless communication management module 720 may be used to manage one or more aspects of wireless communication for the device 715-*a* (e.g., a first device). In some examples, the wireless communication management module 720 may include a pre-scheduling message processing module 735, a scheduling message transmission module 740, or a transmission processing module 745.

The pre-scheduling message processing module 735 may be used to receive a pre-scheduling message for a downlink transmission from a second device (e.g., a base station or Wi-Fi access point). In some examples, the pre-scheduling message may include at least a buffer status of downlink traffic for the device 715-*a*, or an identification of a transmission type, or a restriction on scheduling the downlink transmission, or a combination thereof.

The scheduling message transmission module 740 may be used to transmit a scheduling message to the second device, in response to receiving the pre-scheduling message. The scheduling message may include at least one downlink transmission parameter. In some examples, the at least one downlink transmission parameter of the scheduling message may include at least a radio restriction, or a carrier restriction, or a time restriction, or a frequency restriction, or a MCS restriction, or a beamforming restriction, or a combination thereof. In some examples, the at least one downlink transmission parameter of the scheduling message may include at least a carrier restriction, or a sub-band restriction, or a resource block restriction, or a combination thereof. In some examples, the at least one downlink transmission parameter of the scheduling message may include at least information enabling the first device to satisfy a sleep schedule, or information enabling the first device to satisfy a power usage ceiling, or information enabling the first device to defer use of a wideband data chain.

The transmission processing module 745 may be used to receive the downlink transmission in accordance with the at least one downlink transmission parameter of the scheduling message.

Figure 8:
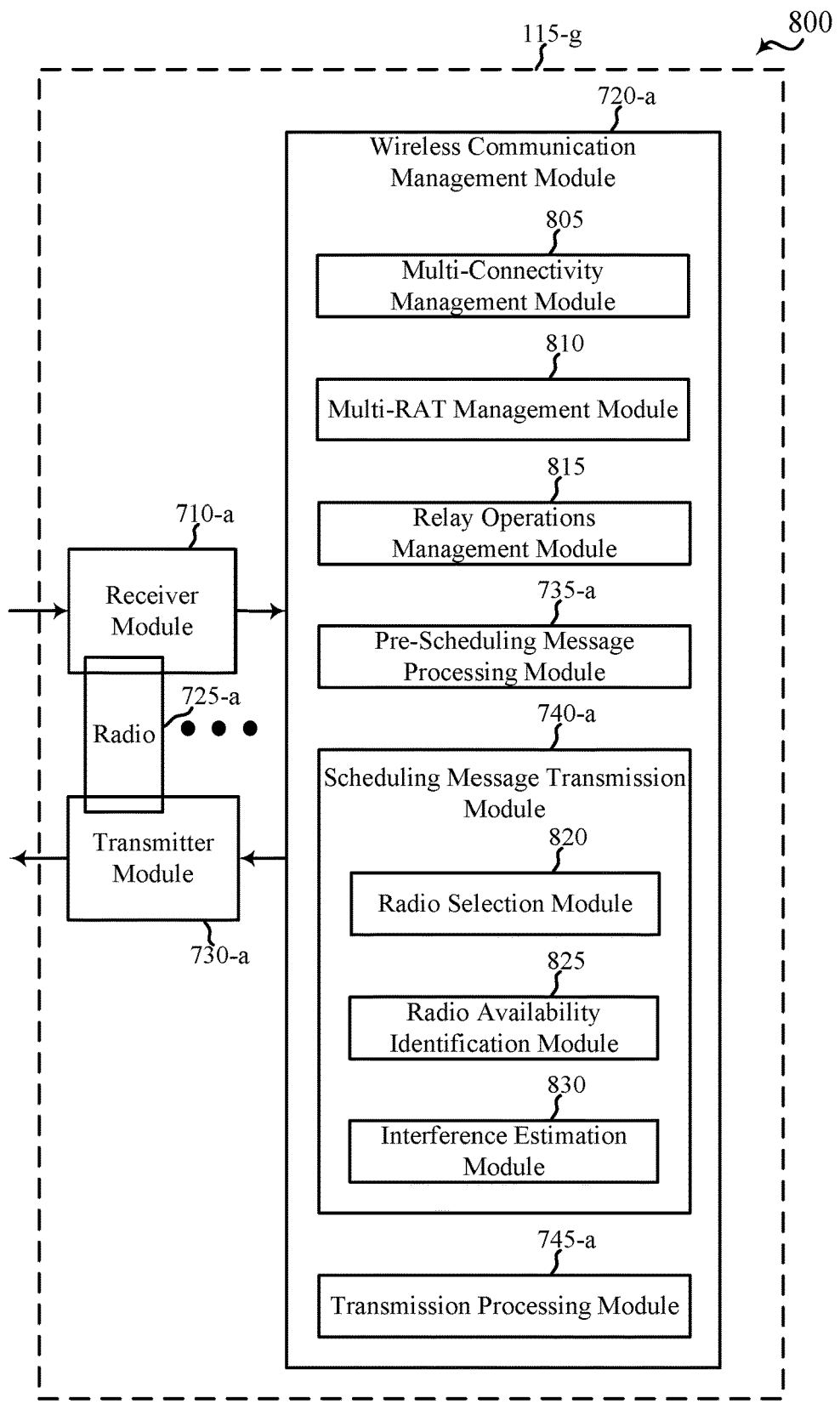
FIG. 8 shows a block diagram of a device for use in wireless communication, in accordance with aspects of the present disclosure.

FIG. 8 shows a block diagram 800 of a device 715-*b* for use in wireless communication, in accordance with aspects of the present disclosure. The device 715-*b* may be an example of aspects of one or more of the UEs 115 or device 715 described with reference to FIG. 13, 4, 5, 6, or 7. The device 715-*b* may also be or include a processor. The device 715-*b* may include a receiver module 710-*a*, a wireless communication management module 720-*a*, a transmitter module 730-*a*, or at least one radio (e.g., radio 725-*a*) which may be respective examples of the receiver module 710, the wireless communication management module 720, the transmitter module 730, or the radio 725 described with reference to FIG. 7. Each of these components may be in communication with each other.

The components of the device 715-*b* may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

The wireless communication management module 720-*a* may be used to manage one or more aspects of wireless communication for the device 715-*b* (e.g., a first device). In some examples, the wireless communication management module 720-*a* may include a multi-connectivity management module 805, a multi-RAT management module 810, a relay operations management module 815, a pre-scheduling message processing module 735-*a*, a scheduling message transmission module 740-*a*, or a transmission processing module 745-*a*. The scheduling message transmission module 740-*a* may include a radio selection module 820, a radio availability identification module 825, or an interference estimation module 830.

The pre-scheduling message processing module 735-*a* may be used to receive a pre-scheduling message for a downlink transmission from a second device (e.g., a base station or Wi-Fi access point). In some examples, the pre-scheduling message may include at least a buffer status of downlink traffic for the device 715-*b*, or an identification of a transmission type, or a restriction on scheduling the downlink transmission, or a combination thereof.

The scheduling message transmission module 740-*a* may be used to transmit a scheduling message to the second device, in response to receiving the pre-scheduling message. The scheduling message may include at least one downlink transmission parameter. In some examples, the at least one downlink transmission parameter of the scheduling message may include at least a radio restriction, or a carrier restriction, or a time restriction, or a frequency restriction, or a MCS restriction, or a beamforming restriction, or a combination thereof. In some examples, the at least one downlink transmission parameter of the scheduling message may include at least a carrier restriction, or a sub-band restriction, or a resource block restriction, or a combination thereof. In some examples, the at least one downlink transmission parameter of the scheduling message may include at least information enabling the first device to satisfy a sleep schedule, or information enabling the first device to satisfy a power usage ceiling, or information enabling the first device to defer use of a wideband data chain.

The transmission processing module 745-a may be used to receive the downlink transmission in accordance with the at least one downlink transmission parameter of the scheduling message.

In some examples, the multi-connectivity management module 805 may be used to operate the device 715-b using a plurality of radios. For example, the device 715-b may be operated in a multi-connectivity mode, as described with reference to FIG. 3. In these examples, the radio selection module 820 may be used to select a subset of radios of the plurality of radios (e.g., to potentially receive the downlink transmission from the second device). When the pre-scheduling message received by the pre-scheduling message processing module 735-a identifies a transmission type, the subset of radios may be selected based at least in part on the transmission type. In some examples, the subset of radios may also be selected based at least in part on one or more other parameters identified in the pre-scheduling message, and/or in response to receiving the pre-scheduling message. In these examples, the radio availability identification module 825 may be used to identify an availability of each radio in the subset of radios. In some examples, the identified availability of each radio may include at least a time domain availability, or a frequency domain availability, or a combination thereof. In these examples, the at least one downlink transmission parameter included in the scheduling message (and transmitted using the scheduling message transmission module 740) may identify the subset of radios selected by the radio selection module 820, and/or the at least one downlink transmission parameter may include an availability of each radio in the subset of radios (as identified by the radio availability identification module 825).

In some examples, the multi-RAT management module 810 may be used to communicate, via the device 715-b, using a plurality of radios and a plurality of RATs. For example, the device 715-b may communicate using a cellular RAT and a Wi-Fi RAT, as described with reference to FIG. 4. In these examples, the radio availability identification module 825 may be used to identify an availability of at least one radio in the plurality of radios, which radio(s) may potentially receive the downlink transmission from the second device. In some examples, the identified availability of the at least one radio may include at least a time domain availability, or a frequency domain availability, or a combination thereof. In some examples, the availability of the at least one radio may be based at least in part on a scheduling or interference of at least one other radio in the plurality of radios. In some examples, the availability of the at least one radio may also be based at least in part on at least one parameter identified in the pre-scheduling message received using the pre-scheduling message processing module 735-a, and/or the availability of the at least one radio may be identified in response to receiving the pre-scheduling message. In these examples, the at least one downlink transmission parameter included in the scheduling message (and transmitted using the scheduling message transmission module 740) may identify the availability of the at least one radio.

In some examples, the relay operations management module 815 may be used to operate the device 715-b as a relay for at least one access link, in parallel with receiving the downlink transmission over a backhaul link (e.g., as described with reference to FIG. 5). In these examples, the radio availability identification module 825 may be used to identify an availability of at least one radio in the plurality of radios, which radio(s) may potentially receive the downlink transmission from the second device. The availability of the at least one radio may be identified based at least in part on a scheduled use of the at least one access link (as determined by the relay operations management module 815). In some examples, the identified availability of the at least one radio may include at least a time domain availability, or a frequency domain availability, or a combination thereof. In some examples, the availability of the at least one radio may also be based at least in part on at least one parameter identified in the pre-scheduling message received using the pre-scheduling message processing module 735-a, and/or the availability of the at least one radio may be identified in response to receiving the pre-scheduling message. In these examples, the at least one downlink transmission parameter included in the scheduling message (and transmitted using the scheduling message transmission module 740) may identify the availability of the at least one radio.

In some examples, a pre-scheduling message received using the pre-scheduling message processing module 735-a may include a pilot signal (or multiple pilot signals). In these examples, the interference estimation module 830 may be used to estimate an interference on a wireless channel based at least in part on the pilot signal. A duration of the interference may also be estimated. In some examples, the wireless channel may be identified in the pre-scheduling message, or the wireless channel may be a channel over which the pre-scheduling message is received. In some examples, the interference on the wireless channel may be estimated in response to receiving the pre-scheduling message. In these examples, the at least one downlink transmission parameter included in the scheduling message (and transmitted using the scheduling message transmission module 740) may be identified based at least in part on the estimated interference and/or the estimated duration of the interference.

Figure 9:
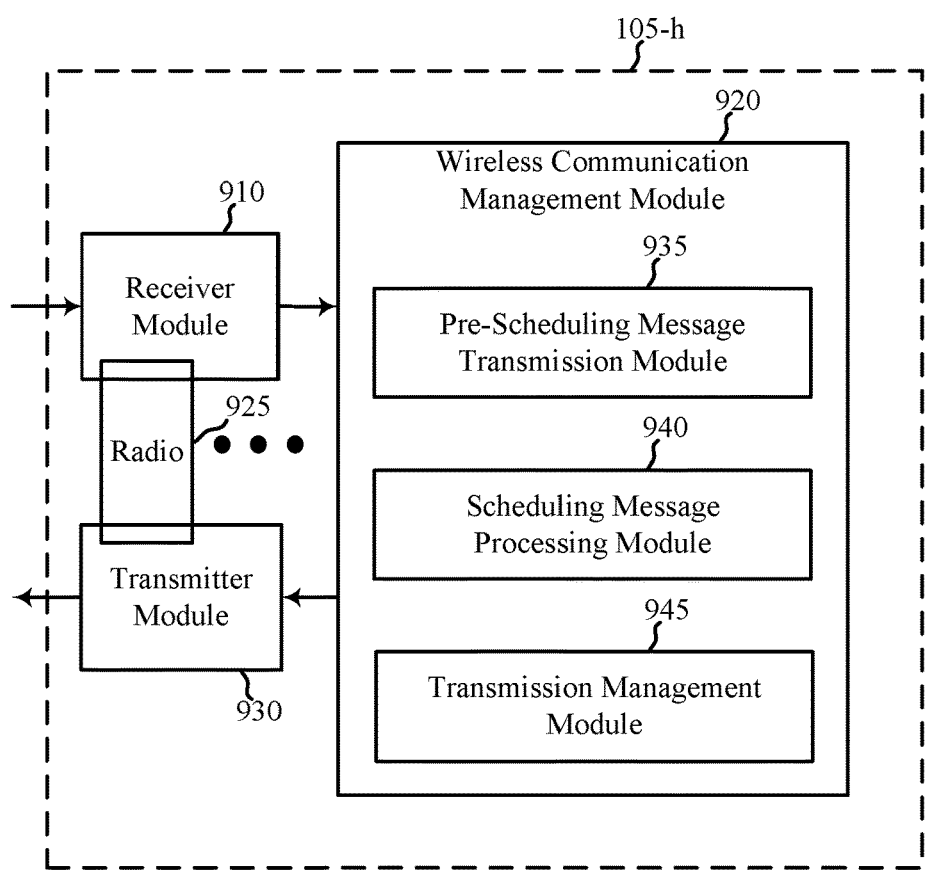
FIG. 9 shows a block diagram of a device for use in wireless communication, in accordance with aspects of the present disclosure.

FIG. 9 shows a block diagram 900 of a device 905 for use in wireless communication, in accordance with aspects of the present disclosure. The device 905 may be an example of aspects of one or more of the base stations 105 described with reference to FIG. 1, 3, 4, 5, or 6. The device 905 may also be or include a processor. The device 905 may include a receiver module 910, a wireless communication management module 920, a transmitter module 930, and at least one radio (e.g., radio 925). Each of these components may be in communication with each other.

The components of the device 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, a SoC, and/or other types of Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 910 may include at least one RF receiver. The receiver module 910 or RF receiver may be used to receive various types of data or control signals (i.e., transmissions) over one or more communication links of a wireless communication system, such as one or more communication links of the wireless communication system 100, 300, 400, 500, or 600 described with reference to FIG. 1, 3, 4, 5, or 6.

In some examples, the transmitter module 930 may include at least one RF transmitter. The transmitter module 930 or RF transmitter may be used to transmit various types of data or control signals (i.e., transmissions) over one or more communication links of a wireless communication system, such as one or more communication links of the wireless communication system 100, 300, 400, 500, or 600 described with reference to FIG. 1, 3, 4, 5, or 6.

In some examples, the radio 925 may be provided by the receiver module 910, the transmitter module 930, or a combination thereof, or the radio 925 may provide part or all of the receiver module 910, the transmitter module 930, or a combination thereof.

The wireless communication management module 920 may be used to manage one or more aspects of wireless communication for the device 905 (e.g., a second device). In some examples, the wireless communication management module 920 may include a pre-scheduling message transmission module 935, a scheduling message processing module 940, or a transmission management module 945.

The pre-scheduling message transmission module 935 may be used to transmit a pre-scheduling message for a downlink transmission to a first device (e.g., a UE). In some examples, the pre-scheduling message may include at least a buffer status of downlink traffic for the first device, or an identification of a transmission type, or a restriction on scheduling the downlink transmission, or a combination thereof.

The scheduling message processing module 940 may be used to receive a scheduling message from the first device. The scheduling message may include at least one downlink transmission parameter. The scheduling message may be received from the first device in response to transmitting the pre-scheduling message. In some examples, the at least one downlink transmission parameter of the scheduling message may include at least a radio restriction, or a carrier restriction, or a time restriction, or a frequency restriction, or a MCS restriction, or a beamforming restriction, or a combination thereof. In some examples, the at least one downlink transmission parameter of the scheduling message may include at least a carrier restriction, or a sub-band restriction, or a resource block restriction, or a combination thereof.

The transmission management module 945 may be used to transmit the downlink transmission in accordance with the at least one downlink transmission parameter of the scheduling message. In some examples, the transmission management module 945 may transmit the downlink transmission upon determining that the at least one downlink transmission parameter of the scheduling message can be satisfied by the device 905, and may not transmit the downlink transmission upon determining that the at least one downlink transmission parameter of the scheduling message cannot be satisfied by the device 905.

Figure 10:
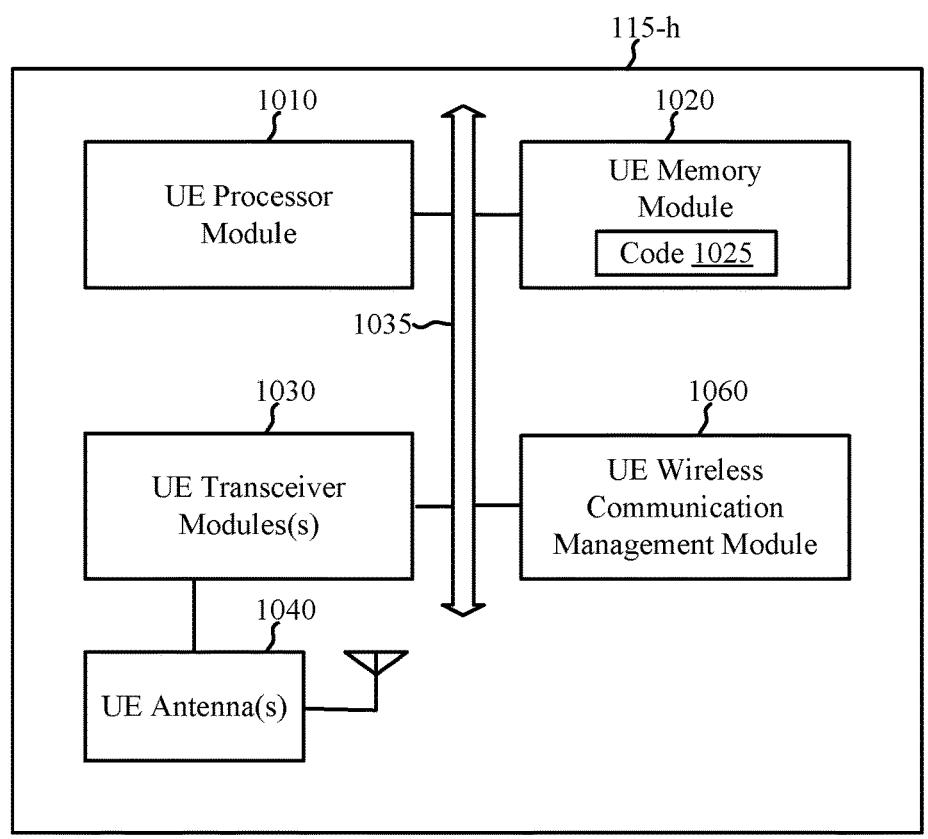
FIG. 10 shows a block diagram of a UE for use in wireless communication, in accordance with aspects of the present disclosure.

FIG. 10 shows a block diagram 1000 of a UE 1015 for use in wireless communication, in accordance with aspects of the present disclosure. The UE 1015 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1015 may, in some examples, have an internal power supply (not shown), such as a small battery, to facilitate mobile operation. In some examples, the UE 1015 may be an example of aspects of one or more of the UEs 115 or devices 715 described with reference to FIG. 1, 3, 4, 5, 6, 7, or 8. The UE 1015 may be configured to implement at least some of the UE or device features and functions described with reference to FIG. 1, 3, 4, 5, 6, 7, or 8.

The UE 1015 may include a UE processor module 1010, a UE memory module 1020, at least one UE transceiver module (represented by UE transceiver module(s) 1030), at least one UE antenna (represented by UE antenna(s) 1040), or a UE wireless communication management module 1060, which may be an example of wireless communication management module 720 described with reference to FIG. 7. Each of these components may be in communication with each other, directly or indirectly, over one or more buses 1035.

The UE memory module 1020 may include random access memory (RAM) or read-only memory (ROM). The UE memory module 1020 may store computer-readable, computer-executable code 1025 containing instructions that are configured to, when executed, cause the UE processor module 1010 to perform various functions described herein related to wireless communication, including, for example, transmitting scheduling messages to a base station. Alternatively, the code 1025 may not be directly executable by the UE processor module 1010 but be configured to cause the UE 1015 (e.g., when compiled and executed) to perform various of the functions described herein.

The UE processor module 1010 may include an intelligent hardware device, e.g., a central processing unit (CPU), a microcontroller, an ASIC, etc. The UE processor module 1010 may process information received through the UE transceiver module(s) 1030 or information to be sent to the UE transceiver module(s) 1030 for transmission through the UE antenna(s) 1040. The UE processor module 1010 may handle, alone or in connection with the UE wireless communication management module 1060, various aspects of communicating over (or managing communications over) one or more wireless channels.

The UE transceiver module(s) 1030 may include a modem configured to modulate packets and provide the modulated packets to the UE antenna(s) 1040 for transmission, and to demodulate packets received from the UE antenna(s) 1040. The UE transceiver module(s) 1030 may, in some examples, be implemented as one or more UE transmitter modules and one or more separate UE receiver modules, and/or as one or more radios. The UE transceiver module(s) 1030 may support communications on one or more wireless channels. The UE transceiver module(s) 1030 may be configured to communicate bi-directionally, via the UE antenna(s) 1040, with one or more of the base stations or Wi-Fi access points, such as one or more of the base stations 105, Wi-Fi access points 145, or devices 905 described with reference to FIG. 1, 3, 4, 5, 6, or 9. While the UE 1015 may include a single UE antenna, there may be examples in which the UE 1015 may include multiple UE antennas 1040.

The UE wireless communication management module 1060 may be configured to perform or control some or all of the UE or device features or functions described with reference to FIG. 1, 3, 4, 5, 6, 7, or 8 related to wireless communication over one or more wireless channels. The UE wireless communication management module 1060, or portions of it, may include a processor, or some or all of the functions of the UE wireless communication management module 1060 may be performed by the UE processor module 1010 or in connection with the UE processor module 1010. In some examples, the UE wireless communication management module 1060 may be an example of the wireless communication management module 720 described with reference to FIG. 7 or 8.

Figure 11:
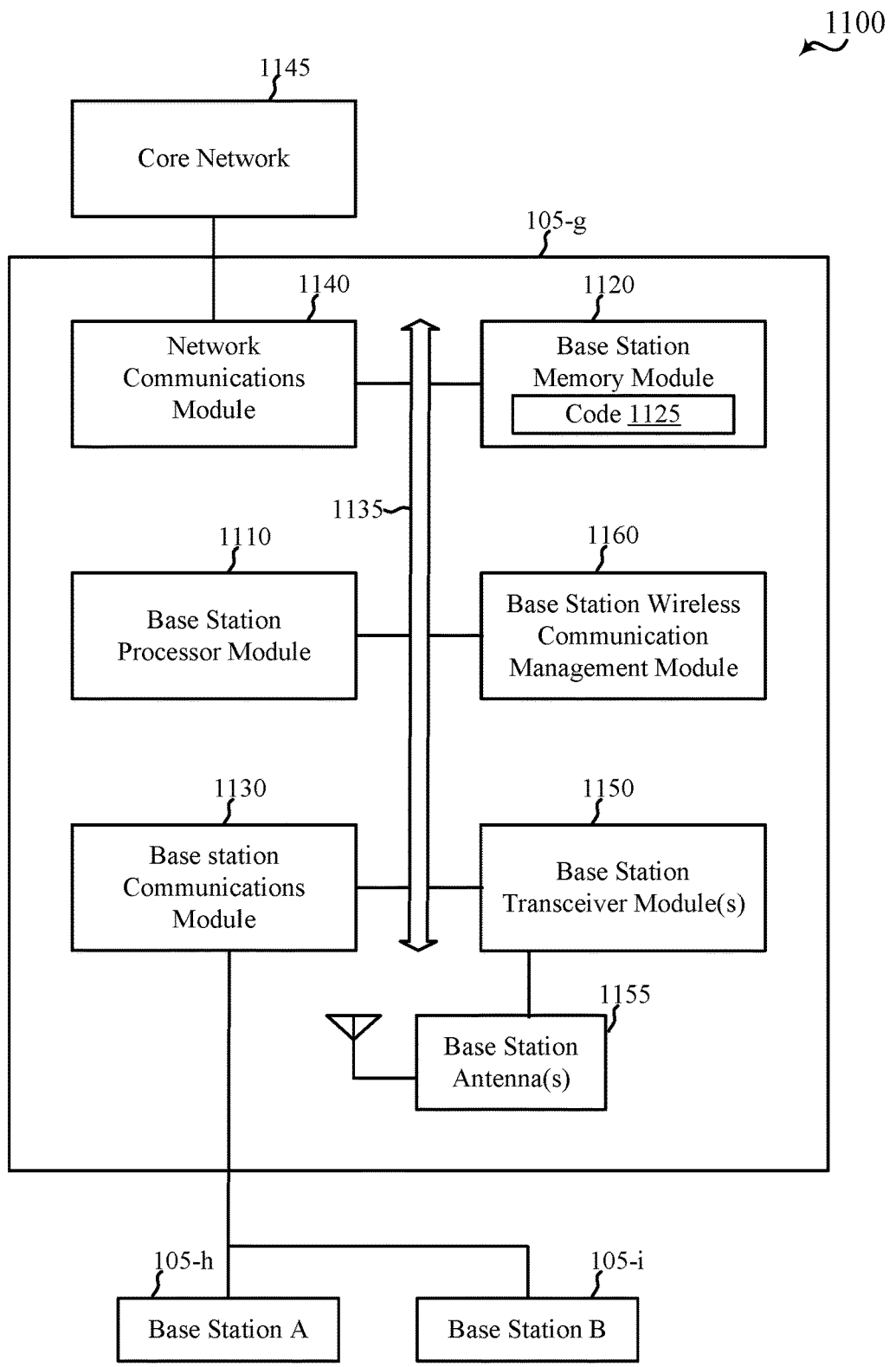
FIG. 11 shows a block diagram of a base station for use in wireless communication, in accordance with aspects of the present disclosure.

FIG. 11 shows a block diagram 1100 of a base station 1105 (e.g., a base station forming part or all of an eNB) for use in wireless communication, in accordance with aspects of the present disclosure. In some examples, the base station 1105 may be an example of one or more aspects of the base stations 105 or devices 905 described with reference to FIG. 1, 3, 4, 5, 6, or 9. The base station 1105 may be configured to implement or facilitate at least some of the base station or device features and functions described with reference to FIG. 1, 3, 4, 5, 6, or 9.

The base station 1105 may include a base station processor module 1110, a base station memory module 1120, at least one base station transceiver module (represented by base station transceiver module(s) 1150), at least one base station antenna (represented by base station antenna(s) 1155), or a base station wireless communication management module 1160, which may be an example of wireless communication management module 920. The base station 1105 may also include one or more of a base station communications module 1130 or a network communications module 1140. Each of these components may be in communication with each other, directly or indirectly, over one or more buses 1135.

The base station memory module 1120 may include RAM or ROM. The base station memory module 1120 may store computer-readable, computer-executable code 1125 containing instructions that are configured to, when executed, cause the base station processor module 1110 to perform various functions described herein related to wireless communication, including, for example, transmitting pre-scheduling messages for downlink transmissions. Alternatively, the code 1125 may not be directly executable by the base station processor module 1110 but be configured to cause the base station 1105 (e.g., when compiled and executed) to perform various of the functions described herein.

The base station processor module 1110 may include an intelligent hardware device, e.g., a CPU, a microcontroller, an ASIC, etc. The base station processor module 1110 may process information received through the base station transceiver module(s) 1150, the base station communications module 1130, or the network communications module 1140. The base station processor module 1110 may also process information to be sent to the transceiver module(s) 1150 for transmission through the base station antenna(s) 1155, to the base station communications module 1130, for transmission to one or more other base stations 105-f and 105-g, or to the network communications module 1140 for transmission to a core network 1145, which may be an example of one or more aspects of the core network 130 described with reference to FIG. 1. The base station processor module 1110 may handle, alone or in connection with the base station wireless communication management module 1160, various aspects of communicating over (or managing communications over) one or more wireless channels.

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules and/or as one or more radios. The base station transceiver module(s) 1150 may support communications on one or more wireless channels. The base station transceiver module(s) 1150 may be configured to communicate bi-directionally, via the base station antenna(s) 1155, with one or more UEs or devices, such as one or more of the UEs 115 or devices 715 described with reference to FIG. 1, 3, 4, 5, 6, 7, 8, or 10. The base station 1105 may, for example, include multiple base station antennas 1155 (e.g., an antenna array). The base station 1105 may communicate with the core network 1145 through the network communications module 1140. The base station 1105 may also communicate with other base stations, such as the base stations 105-h and 105-i, using the base station communications module 1130.

The base station wireless communication management module 1160 may be configured to perform or control some or all of the features or functions described with reference to FIG. 1, 3, 4, 5, 6, or 9 related to wireless communication over one or more wireless channels. The base station wireless communication management module 1160, or portions of it, may include a processor, or some or all of the functions of the base station wireless communication management module 1160 may be performed by the base station processor module 1110 or in connection with the base station processor module 1110. In some examples, the base station wireless communication management module 1160 may be an example of the wireless communication management module 920 described with reference to FIG. 9.

Figure 12:
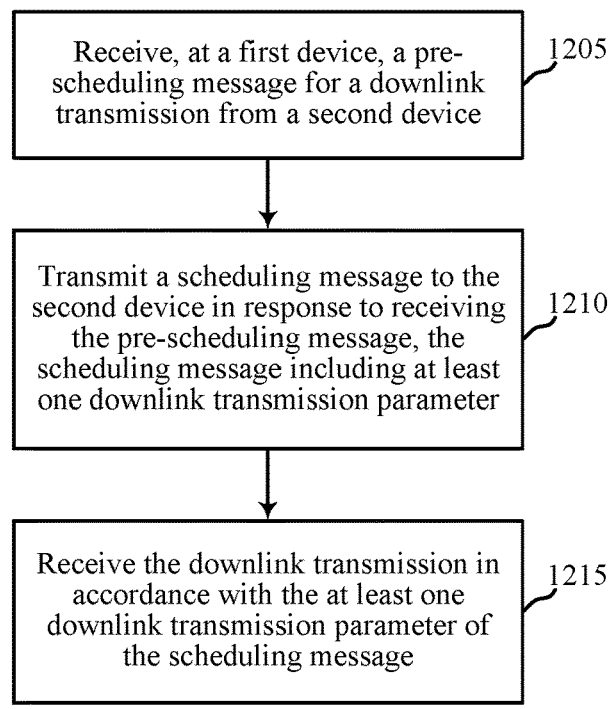
FIG. 12 is a flow chart illustrating an exemplary method for wireless communication, in accordance with aspects of the present disclosure.

FIG. 12 is a flow chart illustrating an exemplary method 1200 for wireless communication, in accordance with aspects of the present disclosure. For clarity, the exemplary method 1200 is described herein with reference to aspects of one or more of the UEs 115, devices 715, or UE 1015, described with reference to FIG. 1, 3, 4, 5, 6, 7, 8, or 10. In some examples, a UE or device may execute one or more sets of codes to control the functional elements of the UE or device to perform the functions described herein. Additionally or alternatively, the UE or device may perform one or more of the functions described herein using special-purpose hardware.

At block 1205, a first device (e.g., a UE) may receive a pre-scheduling message for a downlink transmission from a second device (e.g., a base station or Wi-Fi access point). In some examples, the pre-scheduling message may include at least a buffer status of downlink traffic for the first device, or an identification of a transmission type, or a restriction on scheduling the downlink transmission, or a combination thereof. The operation(s) at block 1205 may be performed using the wireless communication management module 720 described with reference to FIG. 7 or 8, the UE wireless communication management module 1060 described with reference to FIG. 10, or the pre-scheduling message processing module 735 described with reference to FIG. 7 or 8.

At block 1210, the first device may transmit a scheduling message to the second device, in response to receiving the pre-scheduling message. The scheduling message may include at least one downlink transmission parameter. In some examples, the at least one downlink transmission parameter of the scheduling message may include at least a radio restriction, or a carrier restriction, or a time restriction, or a frequency restriction, or a MCS restriction, or a beamforming restriction, or a combination thereof. In some examples, the at least one downlink transmission parameter of the scheduling message may include at least a carrier restriction, or a sub-band restriction, or a resource block restriction, or a combination thereof. In some examples, the at least one downlink transmission parameter of the scheduling message may include at least information enabling the first device to satisfy a sleep schedule, or information enabling the first device to satisfy a power usage ceiling, or information enabling the first device to defer use of a wideband data chain. The operation(s) at block 1210 may be performed using the wireless communication management module 720 described with reference to FIG. 7 or 8, the UE wireless communication management module 1060 described with reference to FIG. 10, or the scheduling message transmission module 740 described with reference to FIG. 7 or 8.

At block 1215, the first device may receive the downlink transmission in accordance with the at least one downlink transmission parameter of the scheduling message. The operation(s) at block 1215 may be performed using the wireless communication management module 720 described with reference to FIG. 7 or 8, the UE wireless communication management module 1060 described with reference to FIG. 10, or the transmission processing module 745 described with reference to FIG. 7 or 8.

Thus, the exemplary method 1200 may provide for wireless communication. It should be noted that the exemplary method 1200 is just one implementation and that the operations of the exemplary method 1200 may be rearranged or otherwise modified such that other implementations are possible.

Figure 13:
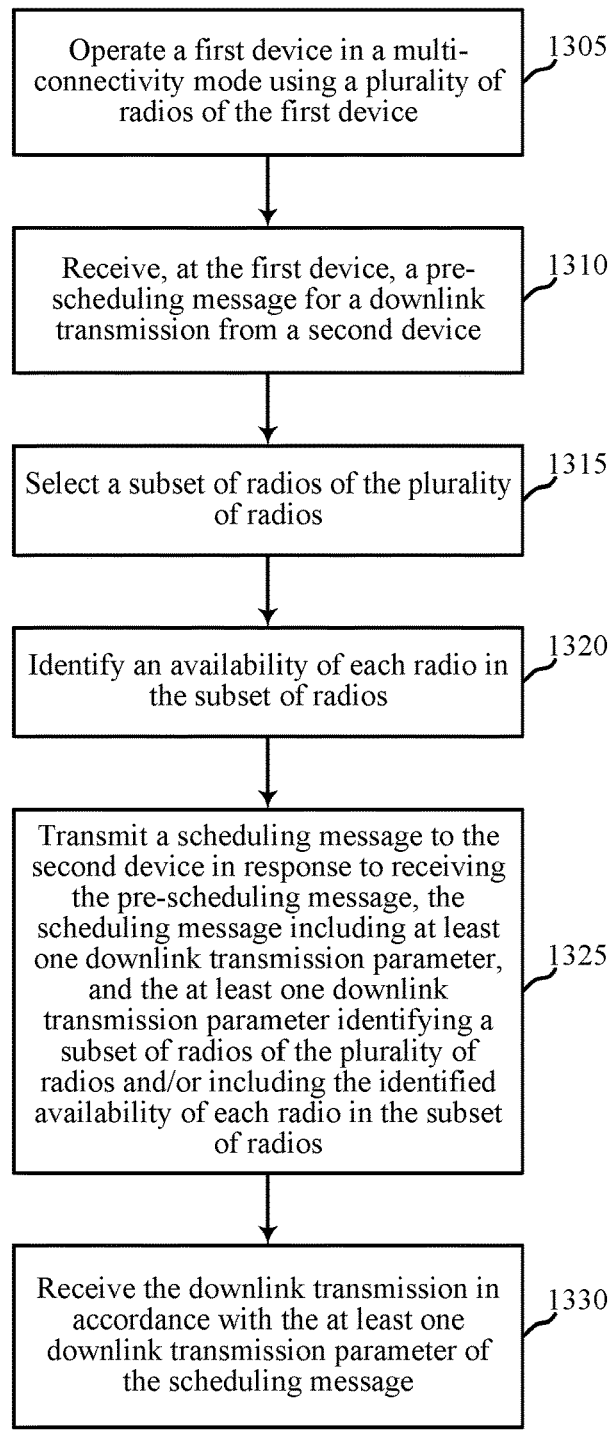
FIG. 13 is a flow chart illustrating an exemplary method for wireless communication, in accordance with aspects of the present disclosure.

FIG. 13 is a flow chart illustrating an exemplary method 1300 for wireless communication, in accordance with aspects of the present disclosure. For clarity, the exemplary method 1300 is described herein with reference to aspects of one or more of the UEs 115, devices 715, or UE 1015 described with reference to FIG. 1, 3, 5, 6, 7, 8, or 10. In some examples, a UE or device may execute one or more sets of codes to control the functional elements of the UE or device to perform the functions described herein. Additionally or alternatively, the UE or device may perform one or more of the functions described herein using special-purpose hardware.

At block 1305, a first device (e.g., a UE) may be operated using a plurality of radios of the first device. For example, the first device may be operated in a multi-connectivity mode, as described with reference to FIG. 3. The operation(s) at block 1305 may be performed using the wireless communication management module 720 described with reference to FIG. 7 or 8, the UE wireless communication management module 1060 described with reference to FIG. 10, or the radio(s) 725 described with reference to FIG. 7 or 8.

At block 1310, the first device may receive a pre-scheduling message for a downlink transmission from a second device (e.g., a base station or Wi-Fi access point). In some examples, the pre-scheduling message may include at least a buffer status of downlink traffic for the first device, or an identification of a transmission type, or a restriction on scheduling the downlink transmission, or a combination thereof. The operation(s) at block 1310 may be performed using the wireless communication management module 720 described with reference to FIG. 7 or 8, the UE wireless communication management module 1060 described with reference to FIG. 10, or the pre-scheduling message processing module 735 described with reference to FIG. 7 or 8.

At block 1315, a subset of radios of the plurality of radios may be selected (e.g., to potentially receive the downlink transmission from the second device). When the pre-scheduling message identifies a transmission type, the subset of radios may be selected based at least in part on the transmission type. In some examples, the subset of radios may also be selected based at least in part on one or more other parameters identified in the pre-scheduling message, and/or in response to receiving the pre-scheduling message. The operation(s) at block 1315 may be performed using the wireless communication management module 720 described with reference to FIG. 7 or 8, the UE wireless communication management module 1060 described with reference to FIG. 10, the scheduling message transmission module 740 described with reference to FIG. 7 or 8, or the radio selection module 820 described with reference to FIG. 8.

At block 1320, an availability of each radio in the subset of radios may be identified. In some examples, the identified availability of each radio may include at least a time domain availability, or a frequency domain availability, or a combination thereof. The operation(s) at block 1320 may be performed using the wireless communication management module 720 described with reference to FIG. 7 or 8, the UE wireless communication management module 1060 described with reference to FIG. 10, the scheduling message transmission module 740 described with reference to FIG. 7 or 8, or the radio availability identification module 825 described with reference to FIG. 8.

At block 1325, the first device may transmit a scheduling message to the second device, in response to receiving the pre-scheduling message. The scheduling message may include at least one downlink transmission parameter. In some examples, the at least one downlink transmission parameter of the scheduling message may identify the subset of radios selected at block 1315. In some examples, the at least one downlink transmission parameter of the scheduling message may also include the availability of each radio, as identified at block 1320. The operation(s) at block 1325 may be performed using the wireless communication management module 720 described with reference to FIG. 7 or 8, the UE wireless communication management module 1060 described with reference to FIG. 10, or the scheduling message transmission module 740 described with reference to FIG. 7 or 8.

At block 1330, the first device may receive the downlink transmission in accordance with the at least one downlink transmission parameter of the scheduling message. The operation(s) at block 1330 may be performed using the wireless communication management module 720 described with reference to FIG. 7 or 8, the UE wireless communication management module 1060 described with reference to FIG. 10, or the transmission processing module 745 described with reference to FIG. 7 or 8.

Thus, the exemplary method 1300 may provide for wireless communication. It should be noted that the exemplary method 1300 is just one implementation and that the operations of the exemplary method 1300 may be rearranged or otherwise modified such that other implementations are possible.

Figure 14:
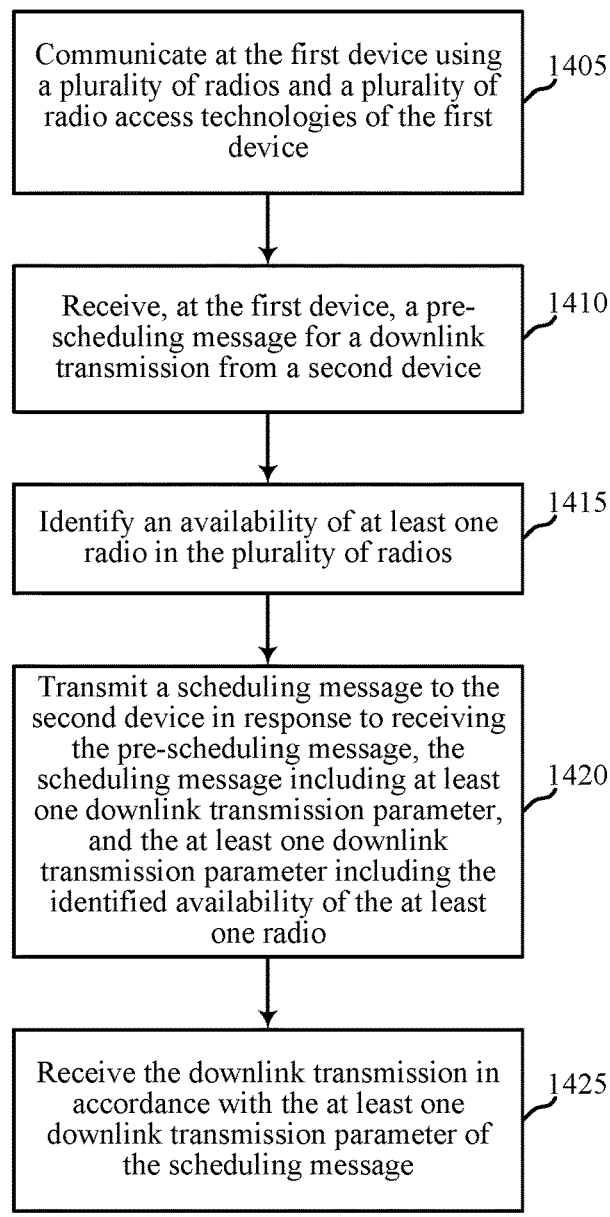
FIG. 14 is a flow chart illustrating an exemplary method for wireless communication, in accordance with aspects of the present disclosure.

FIG. 14 is a flow chart illustrating an exemplary method 1400 for wireless communication, in accordance with aspects of the present disclosure. For clarity, the exemplary method 1400 is described herein with reference to aspects of one or more of the UEs 115, devices 715, or UE 1015 described with reference to FIG. 1, 3, 4, 5, 6, 7, 8, or 10. In some examples, a UE or device may execute one or more sets of codes to control the functional elements of the UE or device to perform the functions described herein. Additionally or alternatively, the UE or device may perform one or more of the functions described herein using special-purpose hardware.

At block 1405, a first device (e.g., a UE) may communicate using a plurality of radios and a plurality of RATs of the first device (e.g., a cellular RAT and a Wi-Fi RAT, as described with reference to FIG. 4). The operation(s) at block 1405 may be performed using the wireless communication management module 720 described with reference to FIG. 7 or 8, the UE wireless communication management module 1060 described with reference to FIG. 10, or the radio(s) 725 described with reference to FIG. 7 or 8.

At block 1410, the first device may receive a pre-scheduling message for a downlink transmission from a second device (e.g., a base station or Wi-Fi access point). In some examples, the pre-scheduling message may include at least a buffer status of downlink traffic for the first device, or an identification of a transmission type, or a restriction on scheduling the downlink transmission, or a combination thereof. The operation(s) at block 1410 may be performed using the wireless communication management module 720 described with reference to FIG. 7 or 8, the UE wireless communication management module 1060 described with reference to FIG. 10, or the pre-scheduling message processing module 735 described with reference to FIG. 7 or 8.

At block 1415, an availability of at least one radio in the plurality of radios may be identified. The at least one radio may include one or more radios that may potentially receive the downlink transmission from the second device. In some examples, the identified availability of the at least one radio may include at least a time domain availability, or a frequency domain availability, or a combination thereof. In some examples, the availability of the at least one radio may be based at least in part on a scheduling or interference of at least one other radio in the plurality of radios. In some examples, the availability of the at least one radio may also be based at least in part on at least one parameter identified in the pre-scheduling message, and/or the availability of the at least one radio may be identified in response to receiving the pre-scheduling message. The operation(s) at block 1415 may be performed using the wireless communication management module 720 described with reference to FIG. 7 or 8, the UE wireless communication management module 1060 described with reference to FIG. 10, the scheduling message transmission module 740 described with reference to FIG. 7 or 8, or the radio availability identification module 825 described with reference to FIG. 8.

At block 1420, the first device may transmit a scheduling message to the second device, in response to receiving the pre-scheduling message. The scheduling message may include at least one downlink transmission parameter. In some examples, the at least one downlink transmission parameter of the scheduling message may include the availability of the at least one radio. The operation(s) at block 1420 may be performed using the wireless communication management module 720 described with reference to FIG. 7 or 8, the UE wireless communication management module 1060 described with reference to FIG. 10, or the scheduling message transmission module 740 described with reference to FIG. 7 or 8.

At block 1425, the first device may receive the downlink transmission in accordance with the at least one downlink transmission parameter of the scheduling message. The operation(s) at block 1425 may be performed using the wireless communication management module 720 described with reference to FIG. 7 or 8, the UE wireless communication management module 1060 described with reference to FIG. 10, or the transmission processing module 745 described with reference to FIG. 7 or 8.

Thus, the exemplary method 1400 may provide for wireless communication. It should be noted that the exemplary method 1400 is just one implementation and that the operations of the exemplary method 1400 may be rearranged or otherwise modified such that other implementations are possible.

Figure 15:
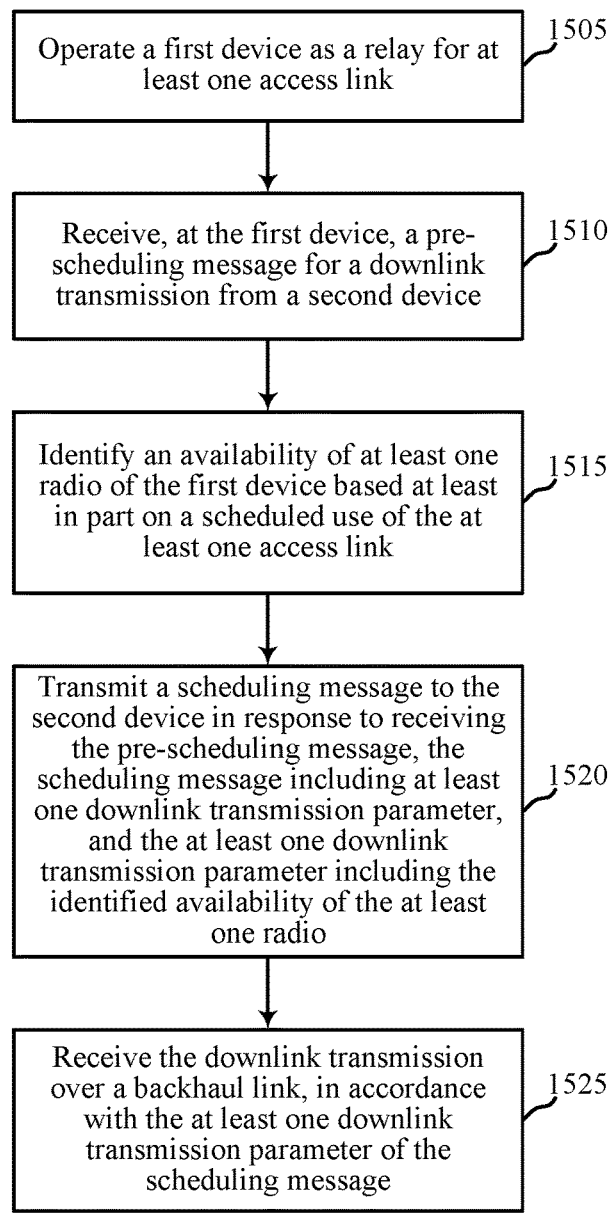
FIG. 15 is a flow chart illustrating an exemplary method for wireless communication, in accordance with aspects of the present disclosure.

FIG. 15 is a flow chart illustrating an exemplary method 1500 for wireless communication, in accordance with aspects of the present disclosure. For clarity, the exemplary method 1500 is described herein with reference to aspects of one or more of the UEs 115, devices 715, or UE 1015 described with reference to FIG. 1, 3, 4, 5, 6, 7, 8, or 10. In some examples, a UE or device may execute one or more sets of codes to control the functional elements of the UE or device to perform the functions described herein. Additionally or alternatively, the UE or device may perform one or more of the functions described herein using special-purpose hardware.

At block 1505, a first device (e.g., a UE) may be operated as a relay for at least one access link, in parallel with receiving the downlink transmission over a backhaul link (e.g., as described with reference to FIG. 5). The operation(s) at block 1505 may be performed using the wireless communication management module 720 described with reference to FIG. 7 or 8, the UE wireless communication management module 1060 described with reference to FIG. 10, or the relay operations management module 815 described with reference to FIG. 7 or 8.

At block 1510, the first device may receive a pre-scheduling message for a downlink transmission from a second device (e.g., a base station or Wi-Fi access point). In some examples, the pre-scheduling message may include at least a buffer status of downlink traffic for the first device, or an identification of a transmission type, or a restriction on scheduling the downlink transmission, or a combination thereof. The operation(s) at block 1510 may be performed using the wireless communication management module 720 described with reference to FIG. 7 or 8, the UE wireless communication management module 1060 described with reference to FIG. 10, or the pre-scheduling message processing module 735 described with reference to FIG. 7 or 8.

At block 1515, an availability of at least one radio of the first device may be identified based at least in part on a scheduled use of the at least one access link. In some examples, the identified availability of the at least one radio may include at least a time domain availability, or a frequency domain availability, or a combination thereof. In some examples, the availability of the at least one radio may also be based at least in part on at least one parameter identified in the pre-scheduling message, and/or the availability of the at least one radio may be identified in response to receiving the pre-scheduling message. The operation(s) at block 1515 may be performed using the wireless communication management module 720 described with reference to FIG. 7 or 8, the UE wireless communication management module 1060 described with reference to FIG. 10, the scheduling message transmission module 740 described with reference to FIG. 7 or 8, or the radio availability identification module 825 described with reference to FIG. 8.

At block 1520, the first device may transmit a scheduling message to the second device, in response to receiving the pre-scheduling message. The scheduling message may include at least one downlink transmission parameter. In some examples, the at least one downlink transmission parameter of the scheduling message may include the availability of the at least one radio. The operation(s) at block 1520 may be performed using the wireless communication management module 720 described with reference to FIG. 7 or 8, the UE wireless communication management module 1060 described with reference to FIG. 10, or the scheduling message transmission module 740 described with reference to FIG. 7 or 8.

At block 1525, the first device may receive the downlink transmission in accordance with the at least one downlink transmission parameter of the scheduling message. The operation(s) at block 1525 may be performed using the wireless communication management module 720 described with reference to FIG. 7 or 8, the UE wireless communication management module 1060 described with reference to FIG. 10, or the transmission processing module 745 described with reference to FIG. 7 or 8.

Thus, the exemplary method 1500 may provide for wireless communication. It should be noted that the exemplary method 1500 is just one implementation and that the operations of the exemplary method 1500 may be rearranged or otherwise modified such that other implementations are possible.

Figure 16:
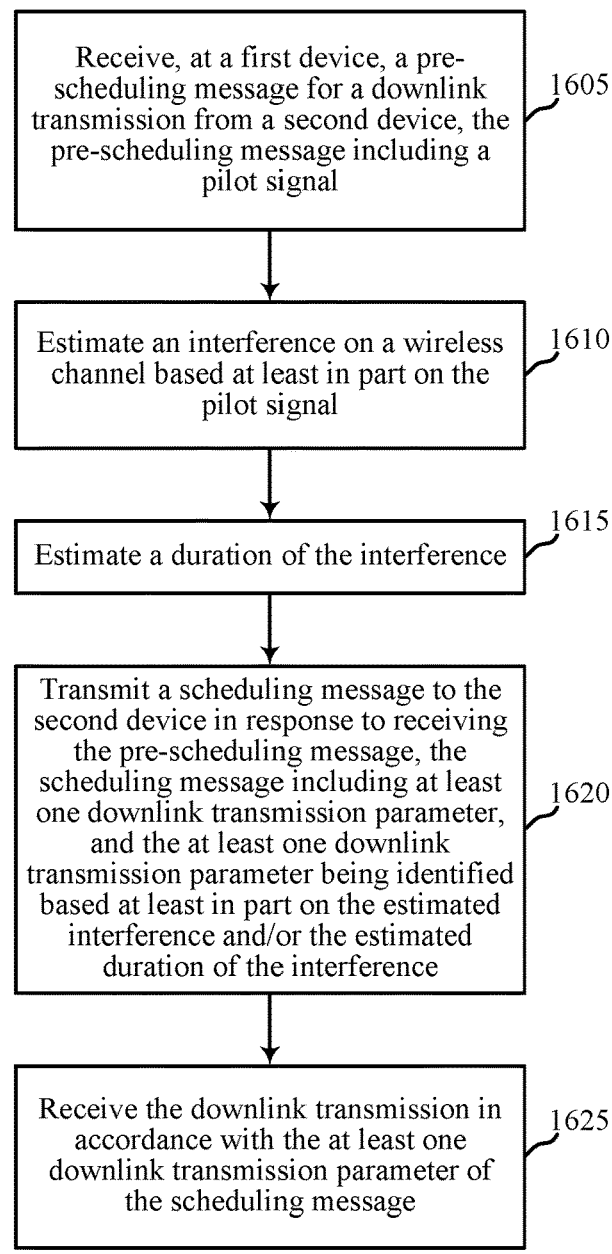
FIG. 16 is a flow chart illustrating an exemplary method for wireless communication, in accordance with aspects of the present disclosure.

FIG. 16 is a flow chart illustrating an exemplary method 1600 for wireless communication, in accordance with aspects of the present disclosure. For clarity, the exemplary method 1600 is described herein with reference to aspects of one or more of the UEs 115, devices 715, or UE 1015 described with reference to FIG. 1, 3, 4, 5, 6, 7, 8, or 10. In some examples, a UE or device may execute one or more sets of codes to control the functional elements of the UE or device to perform the functions described herein. Additionally or alternatively, the UE or device may perform one or more of the functions described herein using special-purpose hardware.

At block 1605, a first device (e.g., a UE) may receive a pre-scheduling message for a downlink transmission from a second device (e.g., a base station or Wi-Fi access point). The pre-scheduling message may include a pilot signal (or multiple pilot signals). In some examples, the pre-scheduling message may also include at least a buffer status of downlink traffic for the first device, or an identification of a transmission type, or a restriction on scheduling the downlink transmission, or a combination thereof. The operation(s) at block 1605 may be performed using the wireless communication management module 720 described with reference to FIG. 7 or 8, the UE wireless communication management module 1060 described with reference to FIG. 10, or the pre-scheduling message processing module 735 described with reference to FIG. 7 or 8.

At block 1610, the first device may estimate an interference on a wireless channel based at least in part on the pilot signal received at block 1605. In some examples, the wireless channel may be identified in the pre-scheduling message, or the wireless channel may be a channel over which the pre-scheduling message is received. In some examples, the interference on the wireless channel may be estimated in response to receiving the pre-scheduling message. The operation(s) at block 1610 or 1615 may be performed using the wireless communication management module 720 described with reference to FIG. 7 or 8, the UE wireless communication management module 1060 described with reference to FIG. 10, the scheduling message transmission module 740 described with reference to FIG. 7 or 8, or the interference estimation module 830 described with reference to FIG. 8.

At block 1615, the first device may optionally estimate a duration of the interference on the wireless channel. The operation(s) at block 1610 or 1615 may be performed using the wireless communication management module 720 described with reference to FIG. 7 or 8, the UE wireless communication management module 1060 described with reference to FIG. 10, the scheduling message transmission module 740 described with reference to FIG. 7 or 8, or the interference estimation module 830 described with reference to FIG. 8.

At block 1620, the first device may transmit a scheduling message to the second device, in response to receiving the pre-scheduling message. The scheduling message may include at least one downlink transmission parameter. In some examples, the at least one downlink transmission parameter may be identified based at least in part on the estimated interference and/or the estimated duration of the interference. The operation(s) at block 1620 may be performed using the wireless communication management module 720 described with reference to FIG. 7 or 8, the UE wireless communication management module 1060 described with reference to FIG. 10, or the scheduling message transmission module 740 described with reference to FIG. 7 or 8.

At block 1625, the first device may receive the downlink transmission in accordance with the at least one downlink transmission parameter of the scheduling message. The operation(s) at block 1625 may be performed using the wireless communication management module 720 described with reference to FIG. 7 or 8, the UE wireless communication management module 1060 described with reference to FIG. 10, or the transmission processing module 745 described with reference to FIG. 7 or 8.

Thus, the exemplary method 1600 may provide for wireless communication. It should be noted that the exemplary method 1600 is just one implementation and that the operations of the exemplary method 1600 may be rearranged or otherwise modified such that other implementations are possible.

In some examples, aspects from two or more of the methods 1200, 1300, 1400, 1500, or 1600 described with reference to FIG. 12, 13, 14, 15, or 16 may be combined. It should be noted that the methods 1200, 1300, 1400, 1500, and 1600 are just example implementations, and that the operations of the methods 1200, 1300, 1400, 1500, or 1600 may be rearranged or otherwise modified such that other implementations are possible.

Figure 17:
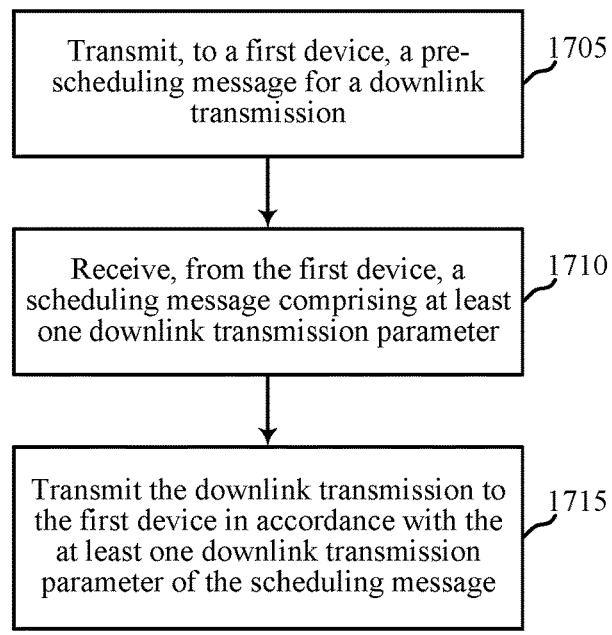
FIG. 17 is a flow chart illustrating an exemplary method for wireless communication, in accordance with aspects of the present disclosure.

FIG. 17 is a flow chart illustrating an exemplary method 1700 for wireless communication, in accordance with aspects of the present disclosure. For clarity, the exemplary method 1700 is described herein with reference to aspects of one or more of the UEs 115, UEs 1015, or devices 715 described with reference to FIG. 1, 3, 4, 5, 6, 7, 8, or 10. In some examples, a UE or device may execute one or more sets of codes to control the functional elements of the UE or device to perform the functions described herein. Additionally or alternatively, the UE or device may perform one or more of the functions described herein using special-purpose hardware.

At block 1705, a second device (e.g., a base station or Wi-Fi access point) may transmit, to a first device (e.g., a UE), a pre-scheduling message for a downlink transmission from the second device. In some examples, the pre-scheduling message may include at least a buffer status of downlink traffic for the first device, or an identification of a transmission type, or a restriction on scheduling the downlink transmission, or a combination thereof. The operation(s)

at block 1705 may be performed using the wireless communication management module 920 described with reference to FIG. 9, the base station wireless communication management module 1160 described with reference to FIG. 11, or the pre-scheduling message transmission module 935 described with reference to FIG. 9.

At block 1710, the second device may receive a scheduling message from the first device. The scheduling message may include at least one downlink transmission parameter. The scheduling message may be received from the first device in response to transmitting the pre-scheduling message. In some examples, the at least one downlink transmission parameter of the scheduling message may include at least a radio restriction, or a carrier restriction, or a time restriction, or a frequency restriction, or a MCS restriction, or a beamforming restriction, or a combination thereof. In some examples, the at least one downlink transmission parameter of the scheduling message may include at least a carrier restriction, or a sub-band restriction, or a resource block restriction, or a combination thereof. The operation(s) at block 1710 may be performed using the wireless communication management module 920 described with reference to FIG. 9, the base station wireless communication management module 1160 described with reference to FIG. 11, or the scheduling message processing module 940 described with reference to FIG. 9.

At block 1715, the second device may transmit the downlink transmission to the first device in accordance with the at least one downlink transmission parameter of the scheduling message. The operation(s) at block 1715 may be performed using the wireless communication management module 920 described with reference to FIG. 9, the base station wireless communication management module 1160 described with reference to FIG. 11, or the transmission management module 945 described with reference to FIG. 9.

In some examples, the exemplary method 1700 may transmit the downlink transmission upon determining that the at least one downlink transmission parameter of the scheduling message can be satisfied by the second device, and may not transmit the downlink transmission upon determining that the at least one downlink transmission parameter of the scheduling message cannot be satisfied by the second device.

Thus, the exemplary method 1700 may provide for wireless communication. It should be noted that the exemplary method 1700 is just one implementation and that the operations of the exemplary method 1700 may be rearranged or otherwise modified such that other implementations are possible.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, during a first time period, a pre-scheduling message for a downlink transmission from a second device;
   transmitting, during a second time period, a scheduling message to the second device in response to receiving the pre-scheduling message, the scheduling message comprising at least one parameter indicating an availability of a first device for receiving the downlink transmission, wherein the first device is a user equipment (UE); and
   receiving, during a third time period, the downlink transmission in accordance with the at least one parameter.

2. The method of claim 1, wherein the first time period and the second time period are within a same subframe.

3. The method of claim 1, wherein the first time period and the third time period are within a same subframe.

4. The method of claim 1, further comprising:
   operating the first device in a multi-connectivity mode using a plurality of radios of the first device, wherein the at least one parameter identifies a subset of radios of the plurality of radios.

5. The method of claim 4, wherein the pre-scheduling message identifies a transmission type, the method further comprising:
   selecting the subset of radios based at least in part on the transmission type.

6. The method of claim 4, further comprising:
   identifying an availability of each radio in the subset of radios;
   wherein the at least one parameter comprises the identified availability of each radio in the subset of radios.

7. The method of claim 6, wherein the identified availability of each radio in the subset of radios comprises at least a time domain availability, or a frequency domain availability, or a combination thereof.

8. The method of claim 1, further comprising:
   communicating at the first device using a plurality of radios and a plurality of radio access technologies of the first device; and
   identifying an availability of at least one radio from the plurality of radios;
   wherein the at least one parameter comprises the identified availability of the at least one radio from the plurality of radios.

9. The method of claim 8, wherein the identified availability of the at least one radio from the plurality of radios comprises at least a time domain availability, or a frequency domain availability, or a combination thereof.

10. The method of claim 8, wherein the identified availability of the at least one radio from the plurality of radios is based at least in part on a scheduling or interference of at least one other radio in the plurality of radios.

11. The method of claim 1, wherein the downlink transmission is received over a backhaul link, the method further comprising:
    operating the first device as a relay for at least one access link; and
    identifying an availability of at least one radio of the first device based at least in part on a scheduled use of the at least one access link;
    wherein the at least one parameter comprises the identified availability of the at least one radio.

12. The method of claim 11, wherein the identified availability of the at least one radio of the first device comprises at least a time domain availability, or a frequency domain availability, or a combination thereof.

13. The method of claim 1, wherein the pre-scheduling message comprises a pilot signal, the method further comprising:
   estimating an interference on a wireless channel based at least in part on the pilot signal; and
   identifying the at least one parameter based at least in part on the estimated interference.

14. The method of claim 13, further comprising:
   estimating a duration of the interference; and
   identifying the at least one parameter based at least in part on the estimated duration of the interference.

15. The method of claim 1, wherein receiving the pre-scheduling message comprises:
   receiving at least a buffer status of downlink traffic for the first device, or an identification of a transmission type, or a restriction on scheduling the downlink transmission, or a combination thereof.

16. The method of claim 1, wherein the at least one parameter comprises at least a radio restriction, or a carrier restriction, or a time restriction, or a frequency restriction, or a modulation and coding scheme (MCS) restriction, or a beamforming restriction, or a combination thereof.

17. The method of claim 1, wherein the at least one parameter comprises at least a carrier restriction, or a sub-band restriction, or a resource block restriction, or a combination thereof.

18. The method of claim 1, wherein the at least one parameter comprises at least information enabling the first device to satisfy a sleep schedule, or information enabling the first device to satisfy a power usage ceiling, or information enabling the first device to defer use of a wideband data chain.

19. An apparatus for wireless communication, comprising:
   means for receiving, during a first time period, a pre-scheduling message for a downlink transmission from a second device;
   means for transmitting, during a second time period, a scheduling message to the second device in response to receiving the pre-scheduling message, the scheduling message comprising at least one parameter indicating an availability of a first device for receiving the downlink transmission, wherein the first device is a user equipment (UE); and
   means for receiving, during a third time period, the downlink transmission in accordance with the at least one parameter.

20. An apparatus for wireless communication, comprising:
   a processor;
   memory in electronic communication with the processor; and
   instructions stored in the memory, the instructions being executable by the processor to cause the apparatus to:
      receive, during a first time period, a pre-scheduling message for a downlink transmission from a second device;
      transmit, during a second time period, a scheduling message to the second device in response to receiving the pre-scheduling message, the scheduling message comprising at least one parameter indicating an availability of a first device for receiving the downlink transmission, wherein the first device is a user equipment (UE); and
      receive, during a third time period, the downlink transmission in accordance with the at least one parameter.

21. A non-transitory computer-readable medium storing computer-executable code for wireless communication, the code executable by a processor to:
   receive, during a first time period, a pre-scheduling message for a downlink transmission from a second device;
   transmit, during a second time period, a scheduling message to the second device in response to receiving the pre-scheduling message, the scheduling message comprising at least one parameter indicating an availability of a first device for receiving the downlink transmission, wherein the first device is a user equipment (UE); and
   receive, during a third time period, the downlink transmission in accordance with the at least one parameter.

22. A method for wireless communication, comprising:
   transmitting, during a first time period, a pre-scheduling message for a downlink transmission;
   receiving, during a second time period, a scheduling message comprising at least one parameter indicating an availability of a first device for receiving the downlink transmission, wherein the first device is a user equipment (UE); and
   transmitting, during a third time period, the downlink transmission to the first device in accordance with the at least one parameter.

23. The method of claim 22, wherein the first time period and the second time period are within a same subframe.

24. The method of claim 22, wherein the first time period and the third time period are within a same subframe.

25. The method of claim 22, further comprising:
   transmitting the downlink transmission upon determining that the at least one parameter can be satisfied.

26. The method of claim 22, wherein the pre-scheduling message comprises at least a buffer status of downlink traffic for the first device, or a transmission type, or a restriction on scheduling the downlink transmission, or a combination thereof.

27. An apparatus for wireless communication, comprising:
   means for transmitting, during a first time period, a pre-scheduling message for a downlink transmission;
   means for receiving, during a second time period, a scheduling message comprising at least one parameter indicating an availability of a first device for receiving the downlink transmission, wherein the first device is a user equipment (UE); and
   means for transmitting, during a third time period, the downlink transmission to the first device in accordance with the at least one parameter.

28. An apparatus for wireless communication, comprising:
   a processor;
   memory in electronic communication with the processor; and
   instructions stored in the memory, the instructions being executable by the processor to cause the apparatus to:
      transmit, during a first time period, a pre-scheduling message for a downlink transmission;
      receive, during a second time period, a scheduling message comprising at least one parameter indicating an availability of a first device for receiving the downlink transmission, wherein the first device is a user equipment (UE); and
      transmit, during a third time period, the downlink transmission to the first device in accordance with the at least one parameter.

29. A non-transitory computer-readable medium storing computer-executable code for wireless communication, the code executable by a processor to:
    transmit, during a first time period, a pre-scheduling message for a downlink transmission;
    receive, during a second time period, a scheduling message comprising at least one parameter indicating an availability of a first device for receiving the downlink transmission, wherein the first device is a user equipment (UE); and
    transmit, during a third time period, the downlink transmission to the first device in accordance with the at least one parameter.

\* \* \* \* \*